US 11,424,853 B2

(12) United States Patent
Lyashev et al.

(10) Patent No.: US 11,424,853 B2
(45) Date of Patent: Aug. 23, 2022

(54) DEVICE AND METHOD FOR COMPRESSING AND/OR DECOMPRESSING CHANNEL STATE INFORMATION

(71) Applicant: Huawei Technologies Co., Ltd., Shenzhen (CN)

(72) Inventors: Vladimir Alexandrovich Lyashev, Moscow (RU); Luis Alberto Suarez Rivera, Moscow (RU); Nikita Andreevich Ryabov, Moscow (RU); Alexander Ivanovich Sherstobitov, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/833,269

(22) Filed: Mar. 27, 2020

(65) Prior Publication Data

US 2020/0228232 A1    Jul. 16, 2020

Related U.S. Application Data

(63) Continuation of application No. PCT/RU2017/000718, filed on Sep. 28, 2017.

(51) Int. Cl.
*H04L 1/00* (2006.01)
*H04B 7/0417* (2017.01)
(Continued)

(52) U.S. Cl.
CPC ......... *H04L 1/0029* (2013.01); *H04B 7/0417* (2013.01); *H04B 7/0626* (2013.01); *H04L 27/2636* (2013.01)

(58) Field of Classification Search
CPC . H04L 1/0029; H04L 27/2636; H04B 7/0626; H04B 7/0663; H04B 7/0658; H04B 7/0417; H04W 24/10
See application file for complete search history.

(56) References Cited

U.S. PATENT DOCUMENTS 8,213,368 B2    7/2012  Hui et al.
10,256,885 B2 *  4/2019  Yoshimura ........... H04B 7/0626
(Continued)

FOREIGN PATENT DOCUMENTS

CN    102325013 A    1/2012
CN    102884745 A    1/2013
EP    2180647 A1    4/2010

OTHER PUBLICATIONS

Joung et al. "Principal Component Analysis (PCA)-based Massive-MIMO Channel Feedback", Dec. 2015, arXiv:1512.05068 [cs.IT], pp. 1-10. (Year: 2015).*
(Continued)

*Primary Examiner* — Sophia Vlahos
(74) *Attorney, Agent, or Firm* — Leydig, Voit & Mayer, Ltd.

(57) ABSTRACT

Embodiments relate to generating compressed channel state information and restoring the channel state information from the compressed channel state information. A computation device for compressing channel state information, CSI, representing a channel transfer function H having a spatial dimension and a frequency dimension comprises a transforming unit configured to perform a spatial transformation and a frequency-to-time transformation subsequently and in any order on the channel transfer function H to obtain a transformed channel transfer function HT, and a compressing unit configured to select values of the transformed channel transfer function HT and to generate compressed channel state information, CCSI, based on the selected values.

12 Claims, 9 Drawing Sheets

(51) Int. Cl.
  *H04B 7/06*  (2006.01)
  *H04L 27/26*  (2006.01)

(56) References Cited

U.S. PATENT DOCUMENTS

| | | | | |
|---|---|---|---|---|
| 10,298,305 | B2* | 5/2019 | Lau | H04L 1/0026 |
| 2005/0058095 | A1* | 3/2005 | Sadri | H04B 7/0626 |
| | | | | 370/329 |
| 2007/0153731 | A1 | 7/2007 | Fine | |
| 2008/0019457 | A1 | 1/2008 | Waters et al. | |
| 2011/0135021 | A1* | 6/2011 | Hatakawa | H04L 1/0029 |
| | | | | 375/260 |
| 2012/0063527 | A1* | 3/2012 | Hatakawa | H04L 25/03343 |
| | | | | 375/260 |
| 2013/0201912 | A1* | 8/2013 | Sheng | H04B 7/0634 |
| | | | | 370/328 |
| 2021/0119674 | A1* | 4/2021 | Yuan | H04L 5/0053 |

OTHER PUBLICATIONS

Kuo et al. "Compressive sensing based channel feedback protocols for spatially-correlated massive antenna arrays", Jun. 2012, 2012 IEEE Wireless Communications and Networking Conference (WCNC), pp. 492-497 (Year: 2012).*

Shirani-Mehr et al., "Channel State Feedback Schemes for Multiuser MIMO-OFDM Downlink," IEEE Transactions on Communications, vol. 57, No. 9, pp. 2713-2723, Institute of Electrical and Electronics Engineers, New York, New York (Sep. 2009).

Onggosanusi et al., "Reduced Space Channel Feedback for FD-MIMO," 2015 IEEE International Conference on Communications (ICC), pp. 3873-3878, Institute of Electrical and Electronics Engineers, New York, New York (Jun. 2015).

Onggosanusi et al., "Reduced Space Channel Feedback for FD-MIMO," IEEE ICC 2015—Mobile and Wireless Networking Symposium, London, UK, pp. 1-6, Institute of Electrical and Electronics Engineers, New York, New York (Jun. 8-12, 2020).

"3rd Generation Partnership Project; Technical Specification Group Radio Access Network; Evolved Universal Terrestrial Radio Access (E-UTRA); Physical layer procedures (Release 10)," 3GPP TS 36.213 V10.1.0, pp. 1-115, 3rd Generation Partnership Project, Valbonne, France (Mar. 2011).

Suzuki et al., "Efficient and Accurate Channel Feedback for Multi-User MIMO-OFDMA," 2017 17th International Symposium on Communications and Information Technologies (ISCIT), Queensland, Australia, pp. 1-6, Institute of Electrical and Electronics Engineers, New York, New York (Sep. 25-27, 2017).

"3rd Generation Partnership Project; Technical Specification Group Radio Access Network; Evolved Universal Terrestrial Radio Access (E-UTRA); Physical layer procedures (Release 13)," 3GPP TS 36.213 V13.1.1, pp. 1-361, 3rd Generation Partnership Project, Valbonne, France (Mar. 2016).

Ji et al., "Overview of Full-Dimension MIMO in LTE-Advanced Pro," IEEE Communications Magazine, pp. 1-9, Institute of Electrical and Electronics Engineers, New York, New York (Feb. 2017).

Wild et al, "Multi-antenna OFDM channel feedback compression exploiting sparsity," 19th European Wireless Conference, Guildford, United Kingdom, pp. 1-6, Institute of Electrical and Electronics Engineers, New York, New York (Apr. 16-18, 2013).

Zhang et al., "On the Efficient Channel State Information Compression and Feedback for Downlink MIMO-OFDM Systems," IEEE Transactions on Vehicular Technology, vol. 63, No. 7, pp. 1-13, Institute of Electrical and Electronics Engineers, New York, New York (Sep. 2014).

Han et al., "Projection based feedback compression for FDD massive MIMO systems," 2014 IEEE Globecom Workshops (GC Wkshps), Austin, Texas, pp. 1-6, Institute of Electrical and Electronics Engineers, New York, New York (Dec. 2014).

Alodeh et al., "Joint compression and feedback of CSI in correlated multiuser MISO channels," 2016 IEEE 17th International Workshop on Signal Processing Advances in Wireless Communications (SPAWC), Edinburgh, UK, pp. 1-6, Institute of Electrical and Electronics Engineers, New York, New York (Jul. 2016).

Kim et al., "Full Dimension MIMO (FD-MIMO): The Next Evolution of MIMO in LTE Systems," IEEE Wireless Communications, pp. 26-33, Institute of Electrical and Electronics Engineers, New York, New York (Apr. 2014).

Gupta et al., "A Survey of 5G Network: Architecture and Emerging Technologies," IEEE Access, vol. 3, pp. 1206-1232, Institute of Electrical and Electronics Engineers, New York, New York (Aug. 7, 2015).

Kusume et al., "Hybrid Single/Multi-User MIMO TransmissionBased on Implicit Channel Feedback," IEEE ICC 2011, Kyoto City, Japan, pp. 1-6, Institute of Electrical and Electronics Engineers, New York, New York (Jun. 5-9, 2020).

Lee et al., "Exploiting Dominant Eigendirections for FeedbackCompression for FDD-based Massive MIMO Systems", IEEE ICC 2016—Wireless Communications Symposium, Kuala Lumpur, Malaysia, pp. 1-6, Institute of Electrical and Electronics Engineers, New York, New York (May 23-27, 2016).

Rahman et al., "Linear Combination Codebook based CSI FeedbackScheme for FD-MIMO Systems," 2015 IEEE Globecom Workshops (GC Wkshps), San Diego, CA, pp. 1-6, Institute of Electrical and Electronics Engineers, New York, New York (Dec. 6-10, 2015).

* cited by examiner

DEVICE AND METHOD FOR COMPRESSING AND/OR DECOMPRESSING CHANNEL STATE INFORMATION

CROSS-REFERENCE TO RELATED APPLICATIONS

This application is a continuation of International Application No. PCT/RU2017/000718, filed on Sep. 28, 2017, the disclosure of which is hereby incorporated by reference in its entirety.

FIELD OF THE INVENTION

Embodiments of the invention relate to generating compressed channel state information and restoring the channel state information from the compressed channel state information in a communication system, for example in wireless communications.

BACKGROUND

An example for such a communication system is indicated in FIG. 13. It shows a schematic representation of a section of a mobile telecommunications system. Currently, mobile telecommunications are evolving rapidly to fulfill the demands of an ever-growing data traffic. Particularly, MIMO (multiple-input and multiple-output) and Massive MIMO (MIMO in which the number of base station antennas is increased with respect to MIMO) are hot topics nowadays targeted in this direction due to their capabilities to provide high-data capacity for multiple user simultaneously and provide extended cell coverage, while requiring relatively lower transmit power compared to legacy systems.

In the depicted example, a base station 1301 is shown, for example an Evolved Node B (eNodeB) of a Long-Term Evolution (LTE) network, comprising a Number N of antennas. A user equipment (UE), for example a mobile phone 1302, is in communication with the base station 1301.

In order to define the beamforming transmission configuration (transmission power and phase shift of each of the N antennas in each of the F available sub-bands) most suited for the communication, the eNodeB 1301 transmits a series of pilot signals 1303 to the UE 1302. From the received pilot signals 1303, the UE 1302 estimates channel state information CSI. This CSI may, for example, represent a channel transfer function which is given in the form of a channel matrix H of the Size N×F, each matrix element $h_{n,f}$ representing amplitude and phase of a transfer function of a signal path via an antenna n ($0 \leq n \leq N-1$) at a sub-band f ($0 \leq f \leq F-1$). The CSI is then transmitted via a channel state report (CSI report) 1304 back to the eNodeB 1301. Based on the channel state report, the eNodeB 1301 selects the transmission configuration to be used for the communication with the user equipment. Since the channel conditions vary, the CSI needs to be periodically estimated and transmitted as a channel state report.

Repeatedly transmitting the channel state report, however, reduces the channel capacity, i.e. the radio resources, spectrum and time slots available in both directions for the communication between a base station and a user equipment. The portion of the transmitted bits that is not used for communication, but for the channel state report, generally is referred to as an overhead of the channel state report. Therefore, the CSI needs to be compressed before being sent back to the base station in a channel state report, thus reducing the overhead of the channel state report in order to tackle the feedback channel capacity limitation. Compressing the CSI means reducing the size of a digital representation of the CSI, i.e. the number of bits required for transmitting the CSI. There is a trade-off relation between the accuracy of the CSI and the reduction of the overhead.

The accuracy of the CSI is of special importance for MIMO and Massive MIMO systems in order to exploit the functionalities of such a technology. For Frequency Division Duplexing (FDD), this is particularly critical due to the absence of a channel reciprocity between the downlink channel DL (from eNodeB to UE) and the uplink channel UL (from UE to eNodeB), contrary to the scenario of Time Division Duplexing (TDD), where such reciprocity might be exploited. In the current standards for FDD, CSI is sent back from the user equipment UE in a quantized form to the eNodeB by using a Precoding Matrix Indicator (PMI) in order to select a predefined precoder from a codebook. If the number of choices in the codebook is increased to provide a finer resolution, a trade-off between accurate precoder selection and CSI report overhead appears.

In T. Wild, C. Hoek, G. Herzog, and J. Koppenborg, "Multi-antenna OFDM channel feedback compression exploiting sparsity," in Wireless Conference (EW), Proceedings of the 2013 19th European, April 2013, pp. 1-6, the authors propose a CSI compression mechanism basing their approach on the sparsity of the radio channel. In essence, due to multipath characteristics of the radio channel in the time domain, when a signal reaches the receiver, it may arrive replicated in multiple copies each with some characteristic delay associated to a cluster direction. Here, the principle of compression lies in exploiting the frequency correlation by taking the relevant information from the most significant tap delay components after inverse Fourier transform from frequency to time domain and assume similar sparsity characteristics in co-located antennas.

U.S. Pat. No. 8,213,368 B2 by Dennis Hui and Leonid Krasny titled "Adaptive compression of channel feedback based on second order channel statistics" uses the same principle based in Fourier transform from frequency to time. However the main contribution is parameter selection based on statistics, i.e. delay tap quantization configuration using statistical analysis through a spatial transform.

In Y. P. Zhang, P. Wang, S. Feng, P. Zhang, and S. Tong, "On the Efficient Channel State Information Compression and Feedback for Downlink MIMO-OFDM Systems," IEEE Transactions on Vehicular Technology, vol. 63, no. 7, pp. 3263-3275, September 2014, the authors introduce a scheme applicable on slow-varying channels in time domain, making it possible to exploit jointly frequency and time correlation in such scenarios. The time domain correlation exploitation is achieved by compressing just differential changes of the slowly changing channel in time domain, otherwise only frequency correlation is exploited.

In Y. Han, W. Shin, and J. Lee, "Projection based feedback compression for FDD massive MIMO systems," in 2014 IEEE Globecom Workshops (GC Wkshps), December 2014, pp. 364-369, the authors propose a joint compression approach using spatial and time correlation from short time scale historical channel knowledge. Specifically in this proposal the spatial correlation is exploited by projecting a channel vector (corresponding to a row of the above mentioned channel matrix H for a fixed frequency range) to a reduced dimension space using a Karhunen-Loeve transformation (KLT) matrix. The realization of this transform is obtained from the dominant eigendirections from the spatial correlation matrix. One potential drawback of these types of solutions based on KLT might be the fact that such approaches rely on long-term channel statistics, which need to be transmitted and available at the transmitter and the receiver for proper calculation.

In M. Alodeh, S. Chatzinotas, and B. Ottersen, "Joint compression and feedback of CSI in correlated multiuser MISO channels," in 2016 IEEE 17th International Workshop on Signal Processing Advances in Wireless Communications (SPAWC), July 2016, pp. 1-6, the use of the same principle of compression based in reducing dimension of channel direction information with KLT is included. The major contribution of this article is to provide an adaptive quantization scheme to achieve a good trade-off between CSI accuracy and overhead while achieving low losses of performance.

E. Onggosanusi, Y. Li, M. S. Rahman, Y. H. Nam, J. Zhang, J. Y. Seol, and T. Kim, "Reduced space channel feedback for FD-MIMO," in 2015 IEEE International Conference on Communications (ICC), June 2015, pp. 3873-3878, characterize a channel by exploiting spatial correlation. The technique provides a reduced spatial channel matrix for a bi-dimensional (2D) MIMO antenna array, i.e. a rectangular array of antenna elements arranged in rows and columns and having one or more polarization directions (see FIG. 6b). The authors exploit the fact that a signal can reach the receiver terminal via a number of angles of departure clusters with some angular spread associated. These clustering characteristics make it possible to describe the channel matrix by some reduced subspace whose coefficients may be quantized and transmitted back to the eNodeB for precoder calculation.

None of the aforementioned compression proposals is used in current 3GPP standards. In FDD, the CSI closed-loop feedback process initiates when the eNodeB sends a set of CSI reference signal coming from its transmitter antennas to the User Equipment UE. From the received signal in the UE a set of transmission parameters are calculated and sent back in a CSI report. This report consists of a Precoding Matrix Indicator (PMI), a Channel Quality Indicator (CQI) and a Rank Indicator (RI). Particularly the PMI is used to indicate to eNodeB about the most convenient set of precoder weights closest to the ideal channel eigenvector, to be chosen from a set of quantized of precoder matrices contained in a codebook.

In order to increase the accuracy of the codebook precoding, it is needed to increase the number of precoder choices into the codebook, which eventually requires a larger number of bits for PMI, therefore increasing report overhead. Moreover, the set of choices that current 3GPP standard codebook provides is also limited due to its fixed structure with constant amplitude and phase ramp between elements. In addition, resources used for CSI port orthogonal pilot assignment are limited in order to prioritize the available radio resources for data transmission. Taking into account the previously mentioned issues, research industry has made the decision of hardly pushing for better alternative ways to channel information report and channel precoder reconstruction for 16 Tx, 32 Tx, 64 Tx FDD systems and beyond.

SUMMARY

It is therefore an object of the present embodiments to provide an improved device and/or method for compressing and/or decompressing channel state information The foregoing and other objects are achieved by the features of the independent claims. Further implementation forms are apparent from the dependent claims, the description and the figures.

According to a first aspect, a computation device for compressing channel state information, CSI, is provided. The CSI represents a channel transfer function having a spatial dimension and a frequency dimension. The computation device comprises a transforming unit configured to perform a spatial transformation and a frequency-to-time transformation subsequently and in any order on the channel transfer function to obtain a transformed channel transfer function, and a compressing unit configured to select values of the transformed channel transfer function and to generate compressed channel state information, CCSI, based on the selected values.

Compressing the CSI means reducing the size of a digital representation of the CSI. Applying the spatial transformation and the frequency-to-time transformation prior to the compression operation can increase the compression gain, i.e. result in a smaller compressed CSI, without any (or with at most a tolerable) loss in accuracy. More specifically, by applying those transformations, correlations in the spatial and frequency dimensions can be exploited. The size of the channel state information can thus be effectively reduced. This can be useful, for example, for storing the CSI (e.g., in a memory of a base station or a user equipment) or for transmitting the CSI (e.g. in a channel state report), for instance from a user equipment to a base station or vice versa.

In an implementation form of the first aspect, the channel transfer function relates to a number N of transmit antennas and a number F of frequency ranges, and is given in the form of a matrix H with $$H = \begin{pmatrix} H_0 \\ H_1 \\ \vdots \\ H_f \\ \vdots \\ H_{F-1} \end{pmatrix} = \begin{pmatrix} h_{0,0} & h_{0,1} & \cdots & h_{0,n} & \cdots & h_{0,N-1} \\ h_{1,0} & h_{1,1} & \cdots & h_{1,n} & \cdots & h_{1,N-1} \\ \vdots & \vdots & \ddots & \vdots & \ddots & \vdots \\ h_{f,0} & h_{f,1} & \cdots & h_{f,n} & \cdots & h_{f,N-1} \\ \vdots & \vdots & \ddots & \vdots & \ddots & \vdots \\ h_{F-1,0} & h_{F-1,1} & \cdots & h_{F-1,n} & \cdots & h_{F-1,N-1} \end{pmatrix}$$

If the transforming unit is configured to perform the spatial transformation before the frequency-to-time transformation, then the transforming unit is configured to perform the spatial transformation for each row of the matrix H, and to perform the frequency-to-time transformation for each column of a matrix resulting from the spatial transformation. If the transforming unit is configured to perform the frequency-to-time transformation before the spatial transformation, then the transforming unit is configured to perform the frequency-to-time transformation for each column of the matrix H, and to perform the spatial transformation for each row of a matrix resulting from the frequency-to-time transformation.

Thereby, it is possible to transform the channel transfer function by matrix calculations that can easily be carried out.

In a further implementation form of the first aspect, the compressing unit comprises a selecting unit configured to select, from the transformed channel transfer function, a predetermined number L of values having the greatest amplitude or all the values exceeding a predetermined amplitude, and a report generating unit configured to generate a channel state report from the selected values of the transformed channel transfer function.

Thereby, it is possible to take only the most significant information into account for compressing the channel state information and generating the channel state report.

In a further implementation form of the first aspect, the report generating unit is further configured to generate the channel state report in a way that it comprises, for each selected value of the transformed channel transfer function, the position of the selected value in the transformed channel transfer function.

Thereby, it is possible to easily restore the channel state information from the channel state report.

In a further implementation form of the first aspect, the report generating unit is further configured to generate a channel state report in a way that it comprises, for each selected value of the transformed channel transfer function, a triplet including the amplitude and phase of the selected value and an index indicating the position of the selected value in the transformed channel transfer function.

Thereby, it is possible to efficiently include position information in the channel state report.

In a further implementation form of the first aspect, the report generating unit is further configured to perform a normalization of the amplitude of the selected values with respect to the selected value having the maximum amplitude and/or to perform a quantization of the amplitude and/or the phase of the selected values.

Thereby, it is possible to further reduce the overhead in the channel state report.

In a further implementation form of the first aspect, if the channel transfer function is a function of one row of antennas having a number of antennas and one polarization direction of the antennas, the transforming unit is configured to perform the spatial transformation as a one-dimensional spatial transformation. If the channel transfer function is a function of more than one row of antennas and/or more than one polarization direction of the antennas, each row and/or polarization direction having a number of antennas, the transforming unit is configured to perform the following steps for each frequency range: re-shape a linear array comprising all the elements of the channel transfer function related to the respective frequency range into a multi-dimensional array according to the number of rows and polarization directions, perform the spatial transformation as a multi-dimensional spatial transformation, and re-arrange the results of the spatial transformation back into a linear array.

Thereby, it is possible to take different antenna configurations into account.

In a further implementation form of the first aspect, the spatial transformation comprises a Discrete Fourier Transformation, a Fast Fourier Transformation, or a Principal Component Analysis related transformation (e.g., an Eigenvalue Decomposition, a Singular-Value Decomposition, or a Karhunen-Loève Transformation) in the spatial domain of N antennas, and/or the frequency-to-time transformation comprises an Inverse Discrete Fourier Transformation or an Inverse Fast Fourier Transformation in the frequency domain.

Thereby, it is possible to perform the spatial transformation and the frequency-to-time transformation by well-known algorithms that can be carried out efficiently on a processing unit.

The above object is also achieved in accordance with a second aspect.

According to the second aspect, a restoring device for restoring channel state information, CSI, from compressed channel state information CCSI is provided. The CSI represents a channel transfer function having a spatial dimension and a frequency dimension. The device comprises a de-compressing unit configured to de-compress the CCSI in order to obtain a restored transformed channel transfer function, and a re-transforming unit configured to re-transform the restored transformed channel transfer function by performing a time-to-frequency transformation and an inverse spatial transformation and subsequently and in any order on the restored transformed channel transfer function to obtain the restored transfer function HR.

De-compressing the CSI means increasing the size of a digital representation of the CCSI. Applying the inverse spatial transformation and the time-to-frequency transformation after the de-compression operation makes it possible to recover the information of the original CSI (i.e., the CSI before being compressed by exploiting correlations in the spatial and frequency dimensions) with no or at most some tolerable losses. This can be useful, for example, for restoring a channel state report which has been sent, for instance, from a user equipment to a base station or vice versa.

In an implementation form of the second aspect, the restored transformed channel transfer function relates to a number T of time taps and a number K of spatial components, and is given in the form of a matrix HTR with $$HTR = \begin{pmatrix} H_0 \\ H_1 \\ \vdots \\ H_\tau \\ \vdots \\ H_{T-1} \end{pmatrix} = \begin{pmatrix} h_{0,0} & h_{0,1} & \cdots & h_{0,k} & \cdots & h_{0,K-1} \\ h_{1,0} & h_{1,1} & \cdots & h_{1,k} & \cdots & h_{1,K-1} \\ \vdots & \vdots & \ddots & \vdots & \ddots & \vdots \\ h_{\tau,0} & h_{\tau,1} & \cdots & h_{\tau,k} & \cdots & h_{\tau,K-1} \\ \vdots & \vdots & \ddots & \vdots & \ddots & \vdots \\ h_{T-1,0} & h_{T-1,1} & \cdots & h_{T-1,k} & \cdots & h_{T-1,K-1} \end{pmatrix}.$$

If the re-transforming unit is configured to perform the time-to-frequency transformation before the inverse spatial transformation, then the re-transforming unit is configured to perform the time-to-frequency transformation for each column of the matrix HTR, and to perform the inverse spatial transformation for each row of a matrix resulting from the time-to-frequency transformation. If the re-transforming unit is configured to perform the inverse spatial transformation before the time-to-frequency transformation, then the re-transforming unit is configured to perform the inverse spatial transformation for each row of the matrix HTR, and to perform the time-to-frequency transformation for each column of a matrix resulting from the inverse spatial transformation.

Thereby, it is possible to restore channel state information by matrix calculations that can easily be carried out.

In a further implementation form of the second aspect, the de-compressing unit comprises a re-arranging unit configured to re-arrange values included in the CCSI, according to their position information also included in the CCSI, in a two-dimensional matrix.

Thereby, it is possible to reconstruct the two-dimensional arrangement of the values in the restored transformed channel transfer function.

In a further implementation form of the second aspect, the de-compressing unit further comprises a de-quantization unit configured to perform a de-quantization of the amplitude and/or the phase of the values.

Thereby, it is possible to retrieve the original amplitude and/or phase of each of the values.

In a further implementation form of the second aspect, the de-compressing unit further comprises a re-normalizing unit configured to re-normalize the amplitude of the values.

Thereby, it is possible to retrieve the original amplitude of each of the values.

In a further implementation form of the second aspect, if the restored channel transfer function is a function of one row of antennas having a number of antennas and one polarization direction of the antennas, the re-transforming unit is configured to perform the inverse spatial transformation as a one-dimensional inverse spatial transformation, and if the restored channel transfer function is a function of more than one row of antennas and/or more than one polarization direction of the antennas, each row and/or polarization direction having a number of antennas, the re-transforming unit is configured to perform the following steps for each time tap: re-shape a linear array comprising to all the elements of the restored transformed channel transfer function related to the respective time tap into a multi-dimensional array according to the number of rows and polarization directions, perform the inverse spatial transformation as a multi-dimensional inverse spatial transformation, and re-arrange the results of the inverse spatial transformation back into a linear array.

Thereby, it is possible to take different antenna configurations into account.

In a further implementation form of the second aspect, the time-to-frequency transformation comprises a Discrete Fourier Transformation or a Fast Fourier Transformation back to the frequency domain, and/or the inverse spatial transformation comprises an Inverse Discrete Fourier Transformation, an Inverse Fast Fourier Transformation, or an Inverse Principal Component Analysis related transformation (e.g., an Inverse Eigenvalue Decomposition, an Inverse Singular-Value Decomposition, or an Inverse Karhunen-Loève Transformation) back to the spatial domain of N antennas.

Thereby, it is possible to perform the inverse spatial transformation and the time-to-frequency transformation by well-known algorithms that can efficiently be carried out on a processing unit.

The above object is also achieved in accordance with a third aspect.

According to the third aspect, a communication system is provided, comprising a source device configured to transmit channel state information CSI in a compressed manner, and a target device configured to receive the compressed channel state information. The source device includes a computation device according to the first aspect, and/or the target device includes a restoring device according to the second aspect.

Thereby, it is possible to communicate the CSI between a source device and a target device taking advantage of the increased compression gain without any (or with at most a tolerable) loss in accuracy. For example, the source device may be a user equipment and the target device a base station of a wireless communication system, or vice versa.

The above object is also achieved in accordance with a fourth aspect.

According to the fourth aspect, a computation method for compressing channel state information, CSI, is provided. The CSI represents a channel transfer function having a spatial dimension and a frequency dimension. The computation method comprises performing a spatial transformation and a frequency-to-time transformation subsequently and in any order on the channel transfer function to obtain a transformed channel transfer function, and compressing the transformed channel transfer function to generate compressed channel state information, CCSI.

As above, compressing the CSI means reducing the size of a digital representation of the CSI. Applying the spatial transformation and the frequency-to-time transformation prior to the compression operation can increase the compression gain, i.e. result in a smaller compressed CSI, without any (or with at most a tolerable) loss in accuracy. More specifically, by applying those transformations, correlations in the spatial and frequency dimensions can be exploited. The size of the channel state information can thus be effectively reduced. This can be useful, for example, for storing the CSI (e.g., in a memory of a base station or a user equipment) or for transmitting the CSI (e.g., .in a channel state report), for instance from a base station to a user equipment or vice versa).

In a first implementation form according to the fourth aspect, the channel transfer function relates to a number N of transmit antennas and a number F of frequency ranges and is given in the form of a matrix H with $$H = \begin{pmatrix} H_0 \\ H_1 \\ \vdots \\ H_f \\ \vdots \\ H_{F-1} \end{pmatrix} = \begin{pmatrix} h_{0,0} & h_{0,1} & \cdots & h_{0,n} & \cdots & h_{0,N-1} \\ h_{1,0} & h_{1,1} & \cdots & h_{1,n} & \cdots & h_{1,N-1} \\ \vdots & \vdots & \ddots & \vdots & \ddots & \vdots \\ h_{f,0} & h_{f,1} & \cdots & h_{f,n} & \cdots & h_{f,N-1} \\ \vdots & \vdots & \ddots & \vdots & \ddots & \vdots \\ h_{F-1,0} & h_{F-1,1} & \cdots & h_{F-1,n} & \cdots & h_{F-1,N-1} \end{pmatrix}.$$

If the spatial transformation is performed before the frequency-to-time transformation, then the spatial transformation is performed for each row of the matrix H, and the frequency-to-time transformation is performed for each column of a matrix resulting from the spatial transformation. If the frequency-to-time transformation is performed before the spatial transformation, then the frequency-to-time transformation is performed for each column of the matrix H, and the spatial transformation is performed for each row of a matrix resulting from the frequency-to-time transformation.

Thereby, it is possible to transform the channel transfer function by matrix calculations that can easily be carried out.

In a second implementation form according to the fourth aspect as such or according to the first implementation form of the fourth aspect, compressing the transformed channel transfer function comprises selecting, from the transformed channel transfer function, a predetermined number of values having the greatest amplitude or all the values exceeding a predetermined amplitude, and generating a channel state report from the selected values of the transformed channel transfer function.

Thereby, it is possible to take only the most significant information into account for compressing the channel state information and generating the channel state report.

In a third implementation form according to the second implementation form of the fourth aspect, generating a channel state report further comprises generating the channel state report in a way that it comprises, for each selected value of the transformed channel transfer function, the position of the selected value in the transformed channel transfer function.

Thereby, it is possible to easily restore the channel state information from the channel state report.

In a fourth implementation form according to any of the second and third implementation forms of the fourth aspect, generating a channel state report further comprises generating the channel state report in a way that it comprises, for each selected value of the transformed channel transfer function, a triplet including the amplitude and phase of the selected value and an index indicating the position of the selected value in the transformed channel transfer function.

Thereby, it is possible to efficiently include position information in the channel state report.

In a fifth implementation form according to any of the second to fourth implementation forms of the fourth aspect, generating a channel state report further comprises performing a quantization of the amplitude and/or the phase of the selected values and/or performing a normalization of the amplitude of the selected values with respect to the selected value having the maximum amplitude.

Thereby, it is possible to further reduce the overhead in the channel state report.

In a sixth implementation form according to the fourth aspect as such or according to any of the preceding implementation forms of the fourth aspect, if the channel transfer function is a function of one row of antennas having a number of antennas and one polarization direction of the antennas, the spatial Discrete transformation as is performed a one-dimensional spatial transformation. If the channel transfer function is a function of more than one row of antennas and/or more than one polarization direction of the antennas, each row and/or polarization direction having a number of antennas, the following steps are performed for each frequency range: reshape a linear array comprising to all the elements of the channel transfer function related to the respective frequency range into a multi-dimensional array according to the number of rows and polarization directions, perform the spatial transformation as a multi-dimensional spatial transformation, and re-arrange the results of the spatial transformation back into a linear array.

Thereby, it is possible to take different antenna configurations into account.

In a seventh implementation form according to the fourth aspect as such or according to any of the preceding implementation forms of the fourth aspect, the spatial transformation comprises a Discrete Fourier Transformation, a Fast Fourier Transformation, or a Principal Component Analysis related transformation (e.g., an Eigenvalue Decomposition, a Singular-Value Decomposition, or a Karhunen-Loève Transformation) in the spatial domain of N antennas, and/or the frequency-to-time transformation comprises performing an Inverse Discrete Fourier Transformation or an Inverse Fast Fourier Transformation in the frequency domain.

Thereby, it is possible to perform the spatial transformation and the frequency-to-time transformation by well-known algorithms that can that can efficiently be carried out on a processing unit.

The above object is also achieved in accordance with a fifth aspect.

According to the fifth aspect, a method for restoring channel state information, CSI, from compressed channel state information, CCSI, is provided. The CSI represents a channel transfer function having a spatial dimension and a frequency dimension. The method comprises de-compressing the CCSI in order to obtain a restored transformed channel transfer function, and re-transforming the restored transformed channel transfer function by performing an inverse spatial transformation and a time-to-frequency transformation subsequently and in any order on the restored transformed channel transfer function to obtain the restored channel transfer function HR.

As above, de-compressing the CSI means increasing the size of a digital representation of the CCSI. Applying the inverse spatial transformation and the time-to-frequency transformation after the de-compression operation makes it possible to fully or partially recover the information of the CSI that had been compressed by exploiting correlations in the spatial and frequency dimensions with some tolerable losses. This can be useful, for example, for restoring CSI from a channel state report which has, for instance, been sent from a user equipment to a base station or vice versa.

In a first implementation form according to the fifth aspect as such, the restored transformed channel transfer function relates to a number T of time taps and a number K of spatial components, and is given in the form of a matrix HTR with $$HTR = \begin{pmatrix} H_0 \\ H_1 \\ \vdots \\ H_\tau \\ \vdots \\ H_{T-1} \end{pmatrix} = \begin{pmatrix} h_{0,0} & h_{0,1} & \cdots & h_{0,k} & \cdots & h_{0,K-1} \\ h_{1,0} & h_{1,1} & \cdots & h_{1,k} & \cdots & h_{1,K-1} \\ \vdots & \vdots & \ddots & \vdots & \ddots & \vdots \\ h_{\tau,0} & h_{\tau,1} & \cdots & h_{\tau,k} & \cdots & h_{\tau,K-1} \\ \vdots & \vdots & \ddots & \vdots & \ddots & \vdots \\ h_{T-1,0} & h_{T-1,1} & \cdots & h_{T-1,k} & \cdots & h_{T-1,K-1} \end{pmatrix}.$$

If the time-to-frequency transformation is performed before the inverse spatial transformation, the time-to-frequency transformation is performed for each column of the matrix HTR, and the inverse spatial transformation is performed for each row of a matrix resulting from the time-to-frequency transformation. If the inverse spatial transformation is performed before the time-to-frequency transformation, the inverse spatial transformation is performed for each row of the matrix HTR, and the time-to-frequency transformation is performed for each column of a matrix resulting from the inverse spatial transformation.

Thereby, it is possible to restore channel state information by matrix calculations that can easily be carried out.

In a second implementation form according to the fifth aspect as such or according to the first implementation form of the fifth aspect, de-compressing the CCSI comprises re-arranging values included in the CCSI, according to their position information also included in the CCSI, in a two-dimensional matrix.

Thereby, it is possible to reconstruct the two-dimensional arrangement of the values in the restored transformed channel transfer function.

In a third implementation form according to the fifth aspect as such or according to any of the preceding implementation forms of the fifth aspect, de-compressing the CCSI further comprises performing a de-quantization of the amplitude and/or the phase of the values.

Thereby, it is possible to retrieve the original amplitude and/or phase of each of the values.

In a fourth implementation form according to the fifth aspect as such or according to any of the preceding implementation forms of the fifth aspect, de-compressing the CCSI further comprises re-normalizing the amplitude of the values.

Thereby, it is possible to retrieve the original amplitude of each of the values.

In a fifth implementation form according to the fifth aspect as such or according to any of the preceding implementation forms of the fifth aspect, if the restored channel transfer function is a function of one row of antennas having a number of antennas and one polarization direction of the antennas, the inverse spatial transformation is performed as a one-dimensional inverse spatial transformation. If the restored transfer channel function is a function of more than one row of antennas and/or more than one polarization direction of the antennas, each row and/or polarization direction having a number of antennas, the following steps are performed for each time tap: a linear array comprising to all the elements of the restored transformed channel transfer function related to the respective time tap is re-shaped into a multi-dimensional array according to the number of rows and polarization directions, the inverse spatial transformation is performed as a multi-dimensional inverse spatial transformation, and the results of the inverse spatial transformation are re-arranged back into a linear array.

Thereby, it is possible to take different antenna configurations into account.

In a sixth implementation form according to the fifth aspect as such or according to any of the preceding implementation forms of the fifth aspect, the time-to-frequency transformation comprises a Discrete Fourier Transformation or a Fast Fourier Transformation back to the frequency domain, and/or the inverse spatial transformation comprises an Inverse Discrete Fourier Transformation, an Inverse Fast Fourier Transformation, or an inverse Principal Component Analysis related transformation (e.g., an Inverse Eigenvalue Decomposition, an Inverse Singular-Value Decomposition, or an Inverse Karhunen-Loève Transformation) back to the spatial domain of N antennas.

Thereby, it is possible to perform the inverse spatial transformation and the time-to-frequency transformation by well-known algorithms that can efficiently be carried out on a processing unit.

The above object is also achieved in accordance with a sixth aspect.

According to the sixth aspect, a method for transmitting compressed channel state information CCSI as a feedback from a source device to a target device is provided. The method comprises compressing channel state information CSI in the source device by a method according to the fourth aspect, transmitting the CCSI to the target device, and decompressing the transmitted CCSI in the target device by a method according to the fifth aspect.

Thereby, it is possible to communicate the CSI between a source device and a target device taking advantage of the increased compression gain without any (or with at most a tolerable) loss in accuracy. For example, the source device may be a user equipment and the target device a base station of a wireless communication system, or vice versa.

The above object is also achieved in accordance with a seventh aspect.

According to the seventh aspect, a computer program with a program code for performing a method according to the fourth, fifth, or sixth aspect or any one of the implementation forms of these aspects when the program runs on a processor or when executed on a computer.

Thereby, it is possible to perform the methods software-controlled on a processor. Furthermore, the methods can be performed in an automatic and repeatable manner.

More specifically, it should be noted that all the above devices and apparatuses may be implemented based on a discrete hardware circuitry with discrete hardware components, integrated chips or arrangements of chip modules, or based on a signal processing device or chip controlled by a software routine or program stored in a memory, written on a computer-readable medium or downloaded from a network such as the Internet.

It shall further be understood that a preferred embodiment of the invention can also be any combination of the dependent claims or above embodiments with the respective independent claims.

These and other aspects of the invention will be apparent and elucidated with reference to the embodiments described hereinafter.

DETAILED DESCRIPTION

In the following, embodiments of the invention are described with reference to the enclosed figures.

Figure 1:
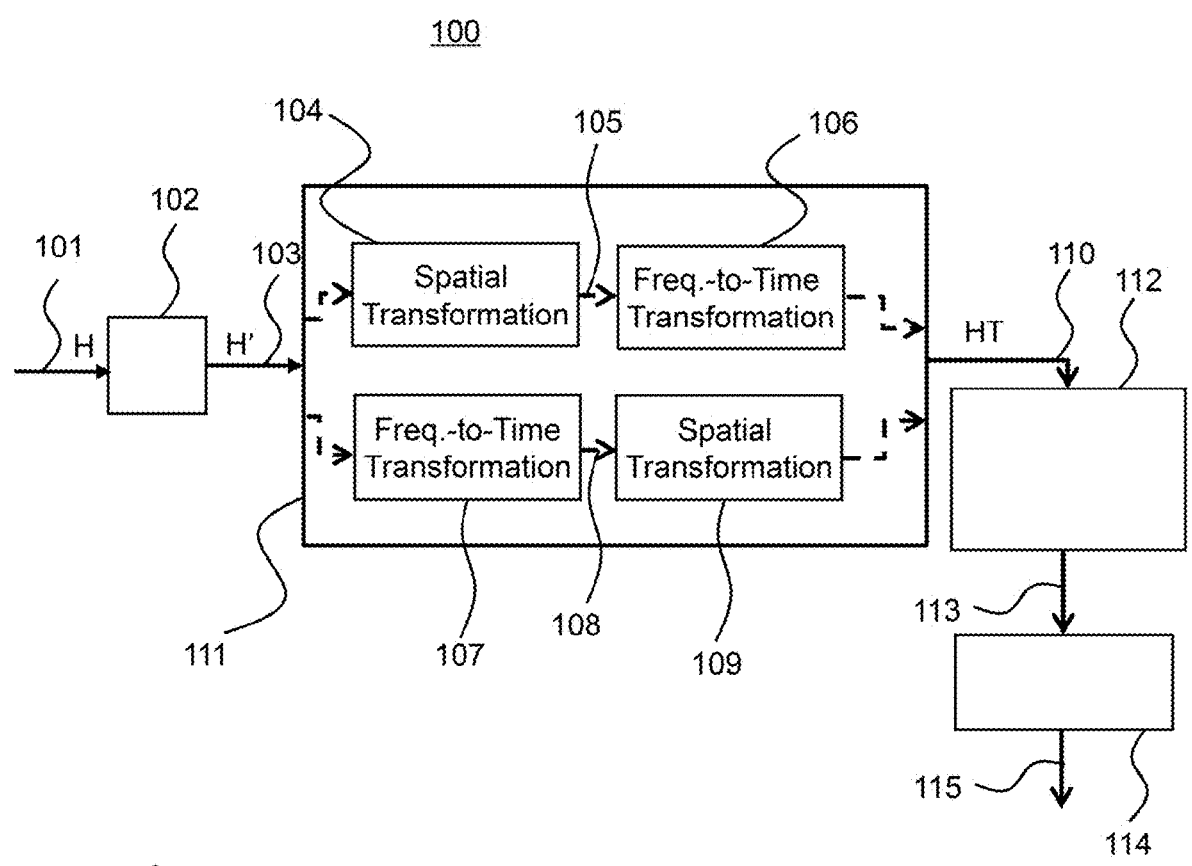
FIG. 1 is a block diagram of a device for compressing channel state information according to an embodiment of the invention.
Figure 13:
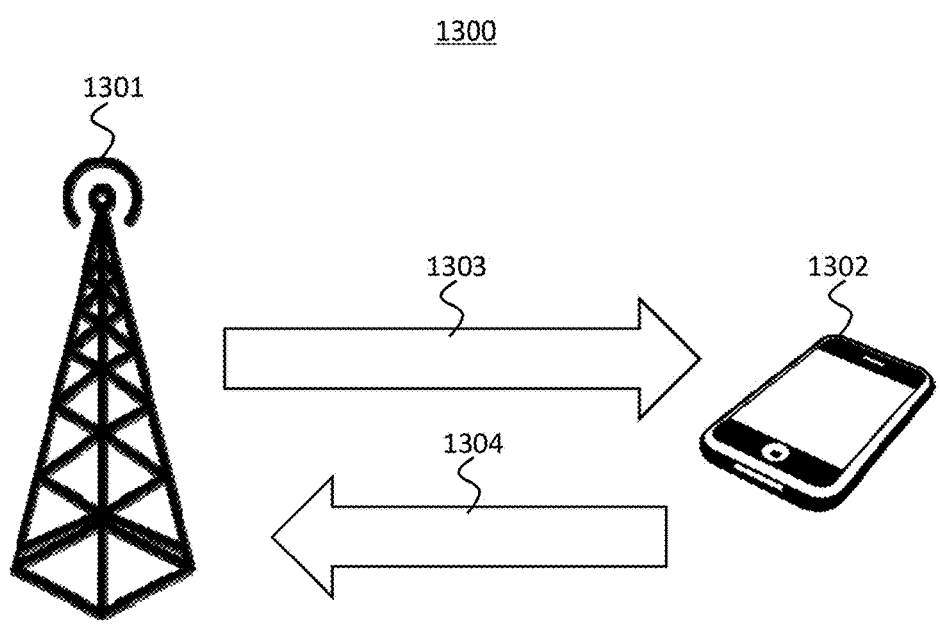
FIG. 13 is a schematic representation of a section of a mobile telecommunications system which is an example for a communication system to which the invention can be applied.

FIG. 1 is a block diagram of a computation device 100 which is configured to compress channel state information (CSI). Such a computation device may, for example, be included in a user equipment (UE) 1302 as it is shown in FIG. 13. The computation device receives CSI 101 representing a channel transfer function H having a spatial dimension corresponding to a number N of transmit antennas and a frequency dimension corresponding to a number F of frequency ranges. The CSI 101 may for example have been estimated by the UE 1302 from a set of pilot signals 1303 sent by the Evolved NodeB (eNodeB) 1301 and received by the UE 1302. From the measurements obtained, the UE estimates CSI 101 having a spatial dimension and a frequency dimension.

Optionally, the computation device 100 comprises a re-shaping unit 102 which is used for re-shaping the channel transfer function H for specific antenna configurations only and will be described later with reference to FIG. 6b.

The computation device 100 further comprises a transforming unit 111. The transforming unit 111 is configured to transform the channel transfer function H 101 (or a re-shaped channel transfer function H' 103) to obtain a transformed channel transfer function HT 110.

According to the invention, both a spatial transformation and a frequency-to-time transformation are carried out subsequently and in any order on the channel transfer function 101 (or the re-shaped channel transfer function 103). Thereby, correlations in the spatial and frequency dimensions can be exploited. Combining those two types of correlation makes it possible to greatly reduce the size of the numerical representation of the CSI during a compression following this combined spatial and frequency-to-time transformation. Nevertheless, a high accuracy of the transmitted CSI can be provided.

The transforming unit 111 is provided with two different signal paths that differ in the order in which the spatial transformation and the frequency-to-time transformation are carried out.

The upper signal path is used for the case that the spatial transformation shall be performed before the frequency-to-time transformation. In that case, the channel transfer function 101 (or the re-shaped channel transfer function 103) is supplied to a spatial transformation unit 104 configured to perform a spatial transformation to obtain an intermediate result 105, and the intermediate result 105 is supplied to a frequency-to-time transformation unit 106 configured to perform a frequency-to-time transformation to obtain the transformed channel transfer function 110.

The lower signal path is used for the case that the frequency-to-time transformation shall be performed before the spatial transformation. In that case, the channel transfer function 101 (or the re-shaped channel transfer function 103) is supplied to a frequency-to-time transformation unit 107 configured to perform a frequency-to-time transformation to obtain an intermediate result 108, and the intermediate result 108 is supplied to a spatial transformation unit 109 configured to perform a spatial transformation to obtain the transformed channel transfer function 110.

Figure 2:
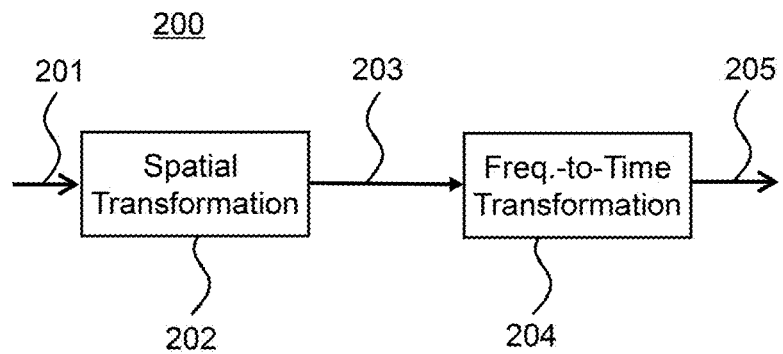
FIG. 2 is a block diagram of a first variant of a transforming unit comprised in the device shown in FIG. 1.
Figure 3:
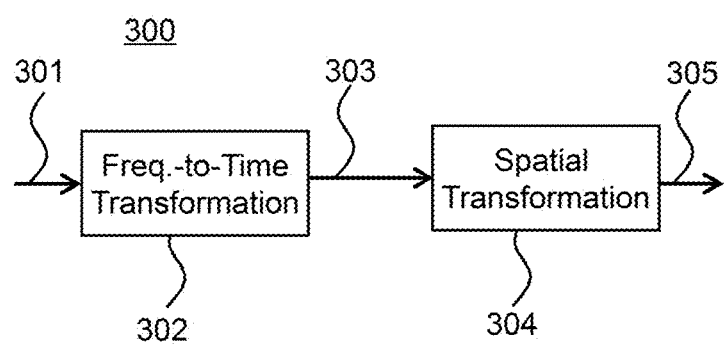
FIG. 3 is a block diagram of a second variant of a transforming unit comprised in the computation device shown in FIG. 1.

Variants of the transforming unit 111 are shown in FIGS. 2 and 3. Therein, FIG. 2 shows a transforming unit 200 configured to perform the spatial transformation before the frequency-to-time transformation, and FIG. 3 shows a transforming unit 300 configured to perform the frequency-to-time transformation before the spatial transformation.

As in the upper signal path of the transforming unit 111, the transforming unit 200 is configured so that the channel transfer function 201 is supplied to a spatial transformation unit 202 configured to perform a spatial transformation to obtain an intermediate result 203, and the intermediate result 203 is supplied to a frequency-to-time transformation unit 204 configured to perform a frequency-to-time transformation to obtain the transformed channel transfer function 205.

As in the lower signal path of the transforming unit 111, the transforming unit 300 is configured so that the channel transfer function 301 is supplied to a frequency-to-time transformation unit 302 configured to perform a frequency-to-time transformation to obtain an intermediate result 303, and the intermediate result 303 is supplied to a spatial transformation unit 304 configured to perform a spatial transformation to obtain the transformed channel transfer function 305.

The general principle of the combined spatial and frequency-to-time transformation is next explained using a linear array example. The spatial dimension in this example relates to a number N of antennas, while the frequency dimension relates to a number F of frequency ranges. Each frequency range may be a sub-band of the frequency band used for communication. The frequency ranges may, however, also be greater than a sub-band, for example comprise more than one sub-band, or smaller than a sub-band, e.g. Subcarrier level or Resource Blocks (RB) level (group of subcarriers) in the 3GPP LTE context.

In the linear array, the channel transfer function H comprises for each frequency range f ($0 \leq f \leq F-1$) a channel vector $H_f$ given by $$H_f 32 (h_{f,0} \; h_{f,1} \ldots h_{f,n} \ldots h_{f,N-1})$$

The entire channel transfer function H is then given in the form of a channel matrix with $$H = \begin{pmatrix} H_0 \\ H_1 \\ \vdots \\ H_f \\ \vdots \\ H_{F-1} \end{pmatrix} = \begin{pmatrix} h_{0,0} & h_{0,1} & \cdots & h_{0,n} & \cdots & h_{0,N-1} \\ h_{1,0} & h_{1,1} & \cdots & h_{1,n} & \cdots & h_{1,N-1} \\ \vdots & \vdots & \ddots & \vdots & \ddots & \vdots \\ h_{f,0} & h_{f,1} & \cdots & h_{f,n} & \cdots & h_{f,N-1} \\ \vdots & \vdots & \ddots & \vdots & \ddots & \vdots \\ h_{F-1,0} & h_{F-1,1} & \cdots & h_{F-1,n} & \cdots & h_{F-1,N-1} \end{pmatrix}$$

A channel vector $H_f$ may therefore be regarded as a row of the channel matrix H. Each of the elements $h_{f,n}$ represents, for example, amplitude and phase of the channel transfer function for a transmission via the antenna n in the frequency range f. If the spatial transformation is performed before the frequency-to-time transformation, then the spatial transformation is performed for each row of the matrix H, and the frequency-to-time transformation is performed for each column of a matrix resulting from the spatial transformation. If the frequency-to-time transformation is performed before the spatial transformation, then the frequency-to-time transformation is performed for each column of the matrix H, and the spatial transformation is performed for each row of a matrix resulting from the frequency-to-time transformation.

As a specific, non-restricting example for spatial and frequency-to-time transformations, an embodiment using Discrete Fourier Transformation is described with reference to FIGS. 4 and 5. Therein, FIG. 4 illustrates a procedure when the spatial transformation is performed before the frequency-to-time transformation, as in the upper path of the transforming unit 111 or in the transforming unit 200, and FIG. 5 illustrates a procedure when the frequency-to-time transformation is performed before the spatial transformation, as in the lower path of the transforming unit 111 or in the transforming unit 300.

Figure 4:
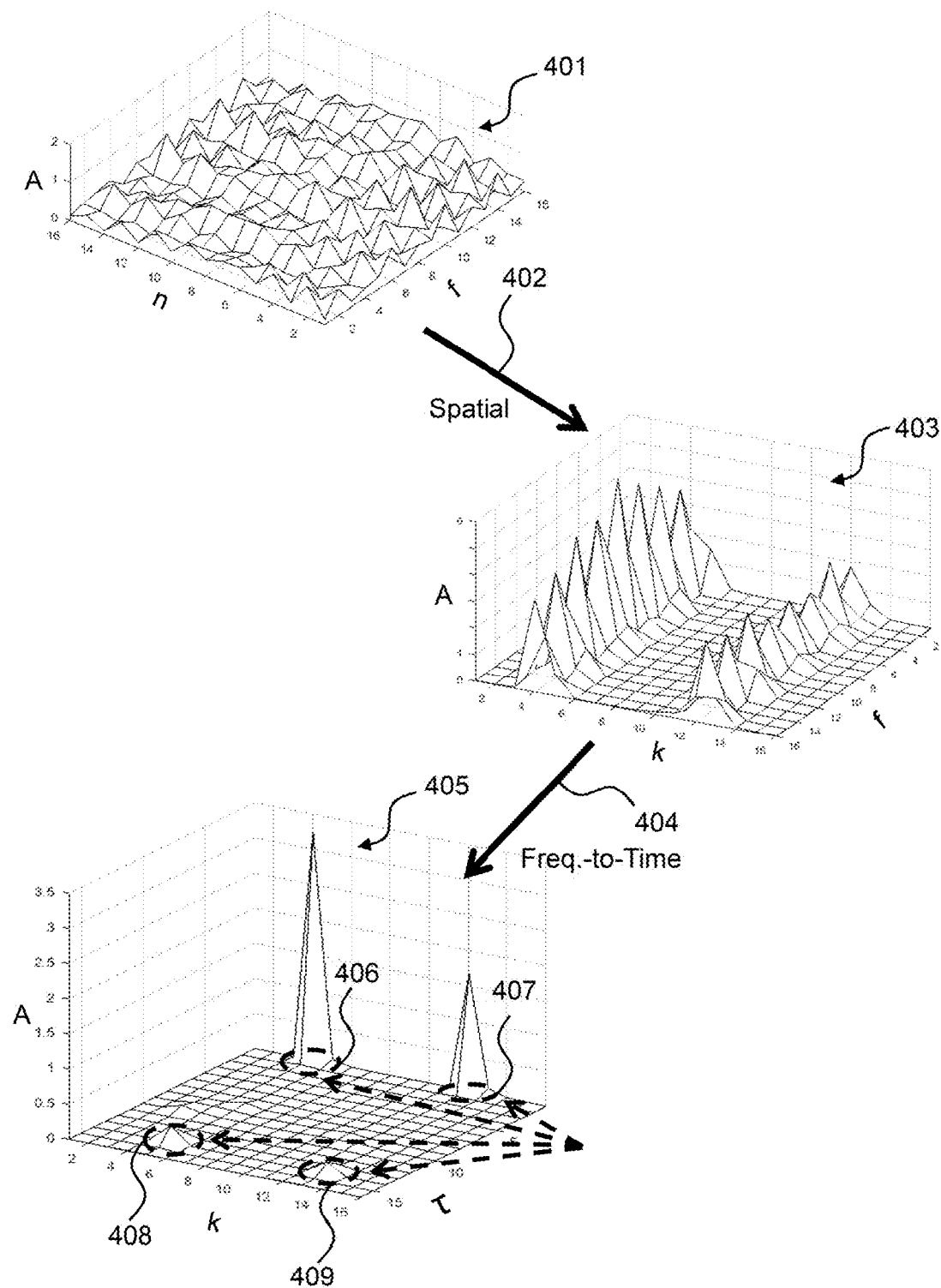
FIG. 4 is a schematic representation of the transformation of a channel transfer function using the circuit shown in FIG. 2.
Figure 5:
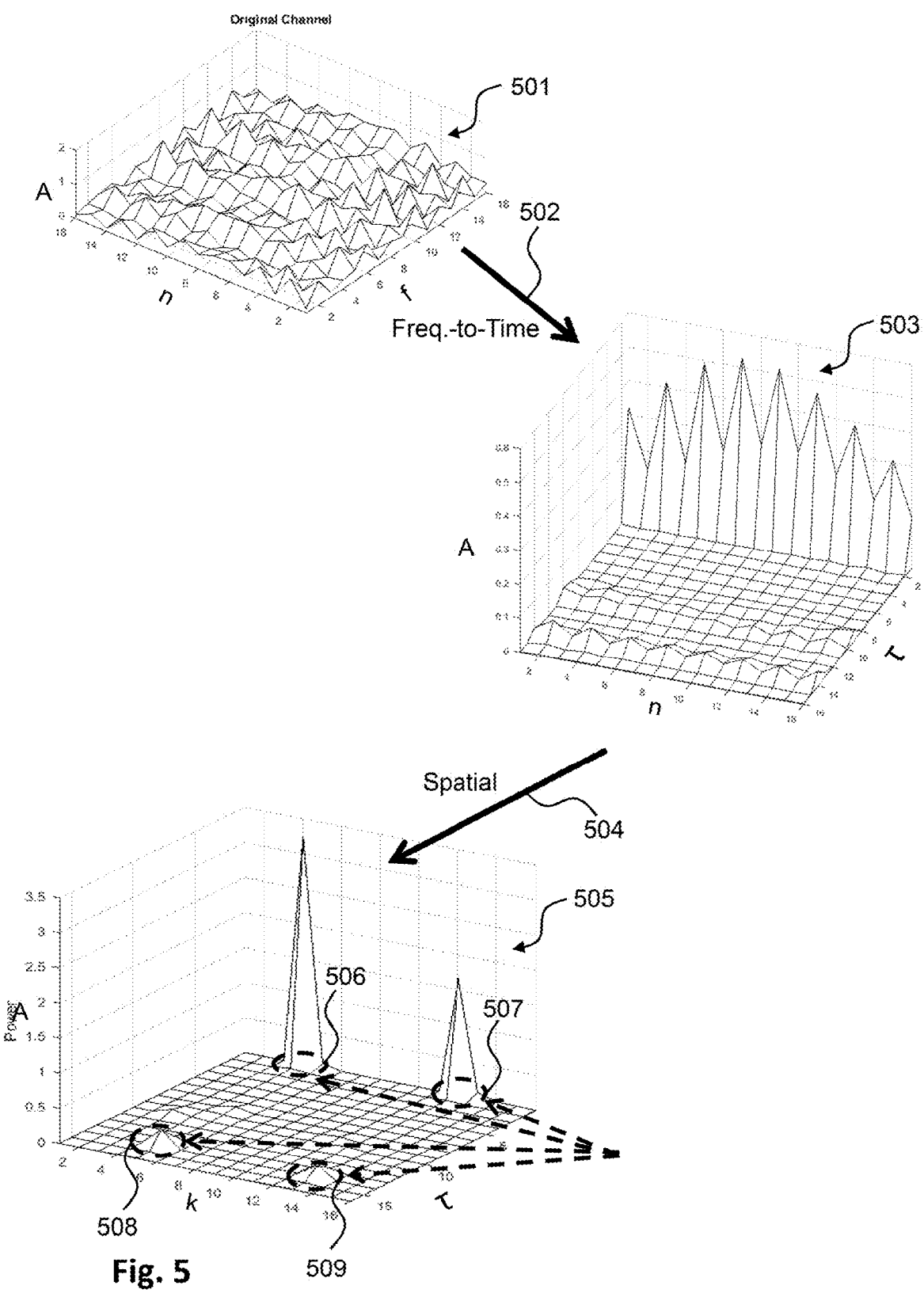
FIG. 5 is a schematic representation of the transformation of a channel transfer function using the circuit shown in FIG. 3

In FIG. 4, plot 401 shows a three-dimensional graphic representation of the channel transfer function H. The frequency ranges f ($0 \leq f \leq F-1$) and the antennas n ($0 \leq n \leq N-1$) form a two-dimensional grid, and the amplitude A of each element $h_{f,n}$ is indicated as a height above that f-n-grid.

A Discrete Fourier Transformation (DFT) 402 is then applied to each channel vector $H_f$ of the channel transfer function H, i.e. to each row of the channel matrix H. In the case of a linear array of antennas comprising a single row of antennas, all having the same polarization direction, the spatial transformation is a one-dimensional DFT. However, if the antenna array comprises more than one rows of antennas, or if more than one polarization direction is used, the spatial transformation is a multi-dimensional DFT. This special case will be discussed later with reference to FIG. 6b.

The result $H_f(k)$ of the DFT is $$H_f(k) = \sum_{n=0}^{N-1} h_{f,n} \cdot e^{\frac{-i2\pi kn}{N}}$$

Performing this transformation for each row of the matrix H results in a matrix HX in the form $$HX = \begin{pmatrix} h_{0,0} & h_{0,1} & \cdots & h_{0,k} & \cdots & h_{0,K-1} \\ h_{1,0} & h_{1,1} & \cdots & h_{1,k} & \cdots & h_{1,K-1} \\ \vdots & \vdots & \ddots & \vdots & \ddots & \vdots \\ h_{f,0} & h_{f,1} & \cdots & h_{f,k} & \cdots & h_{f,K-1} \\ \vdots & \vdots & \ddots & \vdots & \ddots & \vdots \\ h_{F-1,0} & h_{F-1,1} & \cdots & h_{F-1,k} & \cdots & h_{F-1,K-1} \end{pmatrix}.$$

Plot 403 shows a three-dimensional graphic representation of the matrix HX, wherein the amplitude A of each element $h_{f,k}$ is indicated as a height above an f-k-grid. Therein, k ($0 \leq k \leq K-1$) represents spatial components k (in the literature also called "beams") which result from performing the DFT in the spatial domain, i.e. in the rows of the matrix H. As can be seen from plot 403, there are spatial components k of more relevance (i.e. having a higher amplitude) and spatial components k of less relevance (i.e. having a lower amplitude). This results from correlations in the spatial dimension which are exploited by performing the spatial transformation. The purpose of this spatial domain transform is to therefore find the fundamental spatial components that characterize the ideal direction for transmission to this specific UE.

Next, an Inverse Discrete Fourier Transformation (IDFT) 404 is applied to each column of the matrix HX. The result $H_k(\tau)$ of the IDFT is $$H_k(\tau) = \frac{1}{F} \sum_{f=0}^{F-1} h_{f,k} \cdot e^{\frac{i2\pi f\tau}{F}}$$

Performing this transformation for each column of the matrix H results in a transformed channel transfer function in the form of a matrix HT with $$HT = \begin{pmatrix} h_{0,0} & h_{0,1} & \cdots & h_{0,k} & \cdots & h_{0,K-1} \\ h_{1,0} & h_{1,1} & \cdots & h_{1,k} & \cdots & h_{1,K-1} \\ \vdots & \vdots & \ddots & \vdots & \ddots & \vdots \\ h_{\tau,0} & h_{\tau,1} & \cdots & h_{\tau,k} & \cdots & h_{\tau,K-1} \\ \vdots & \vdots & \ddots & \vdots & \ddots & \vdots \\ h_{T-1,0} & h_{T-1,1} & \cdots & h_{T-1,k} & \cdots & h_{T-1,K-1} \end{pmatrix}.$$

Plot 405 shows a three-dimensional graphic representation of the transformed channel transfer function HT, wherein the amplitude A of each element $h_{\tau,k}$ is indicated as a height above a τ-k-grid. Therein, τ ($0 \leq \tau \leq T-1$) represents time delay components (in the literature also called "time taps" or "delay taps") which result from performing the Inverse Discrete Fourier Transformation in the frequency dimension, i.e. in the columns of the matrix HX. As can be seen from plot 405, the channel information is compacted in a number spatial components k, each with associated time taps τ. Some of such taps have more relevance (i.e. having a higher amplitude) whereas some others are of less relevance (i.e. having a lower amplitude). This results from correlation in the frequency dimension which are exploited by performing the frequency-to-time transformation.

As can been seen from plot 405, there remain only few values 406-409 (related to few combinations of time taps τ and spatial components k) having a relevant amplitude after subjecting the channel transfer function H both to a spatial and a frequency-to-time transformation. This results from the fact that by this combination of transformations, frequency and spatial correlations can effectively be exploited.

In FIG. 5, plot 501 shows a three-dimensional graphic representation of the channel transfer function H in the same way as plot 401 in FIG. 4. In this case, an IDFT 502 is first applied to each column of the channel transfer function matrix H, resulting in a matrix HY in the form $$HY = \begin{pmatrix} h_{0,0} & h_{0,1} & \cdots & h_{0,n} & \cdots & h_{0,N-1} \\ h_{1,0} & h_{1,1} & \cdots & h_{1,n} & \cdots & h_{1,N-1} \\ \vdots & \vdots & \ddots & \vdots & \ddots & \vdots \\ h_{\tau,0} & h_{\tau,1} & \cdots & h_{\tau,n} & \cdots & h_{\tau,N-1} \\ \vdots & \vdots & \ddots & \vdots & \ddots & \vdots \\ h_{T-1,0} & h_{T-1,1} & \cdots & h_{T-1,n} & \cdots & h_{T-1,N-1} \end{pmatrix}.$$

Plot 503 shows a three-dimensional graphic representation of the matrix HY, wherein the amplitude A of each element $h_{\tau,n}$ is indicated as a height above a τ-n-grid. Next, a DFT 504 is applied to each row of the matrix HY, resulting in the transformed channel transfer function HT as described above and depicted in plot 505. Also in this case, only few values 506-509 having a relevant amplitude remain.

While DFT and IDFT have been described in these specific examples, any other suited spatial and frequency-to-time transformations may be used. Where possible, DFT and IDFT may be performed as a Fast Fourier Transformation (FFT) or an Inverse Fast Fourier Transformation (IFFT). For the spatial transformation, any Principal Component Analysis (PCA) related transformation like Eigen-value Decomposition (EVD), Singular-Value Decomposition (SVD) or Karhunen-Loève (KL) Transformation may also be used as an alternative. Any other transformation that could exploit sparsity in the spatial dimension may be used to provide a number of principal components in a different field representation. For the frequency dimension transformation, any other transformation that could exploit sparsity may be used in the frequency dimension to provide a number of principal components in a different field representation.

While the spatial transformation in the specific examples has been applied to a channel vector, i.e. a row of the channel matrix for a given frequency range, the channel vector may, for example, also be replaced by an associated eigenvector.

Next, the spatial transformation for different arrangements of antennas will be described.

Figure 6A:
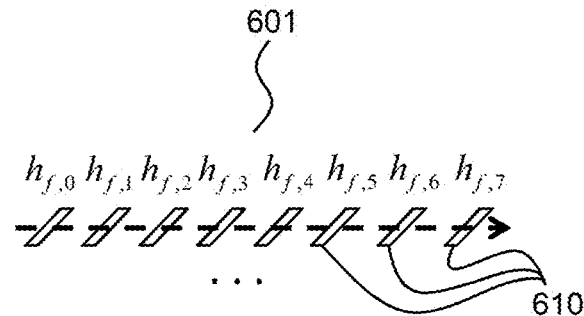
FIG. 6a is a schematic representation related to an arrangement of a number of antennas having the same polarization direction in a single row.

FIG. 6a schematically shows an arrangement 601 of a number of antennas 610 having the same polarization direction in a single row. In this case, the spatial transformation consists of applying a one-dimensional (1D) transformation, for example 1D-DFT or 1D-FFT, to each channel vector Hf of each frequency range f, as described above.

Figure 6B:
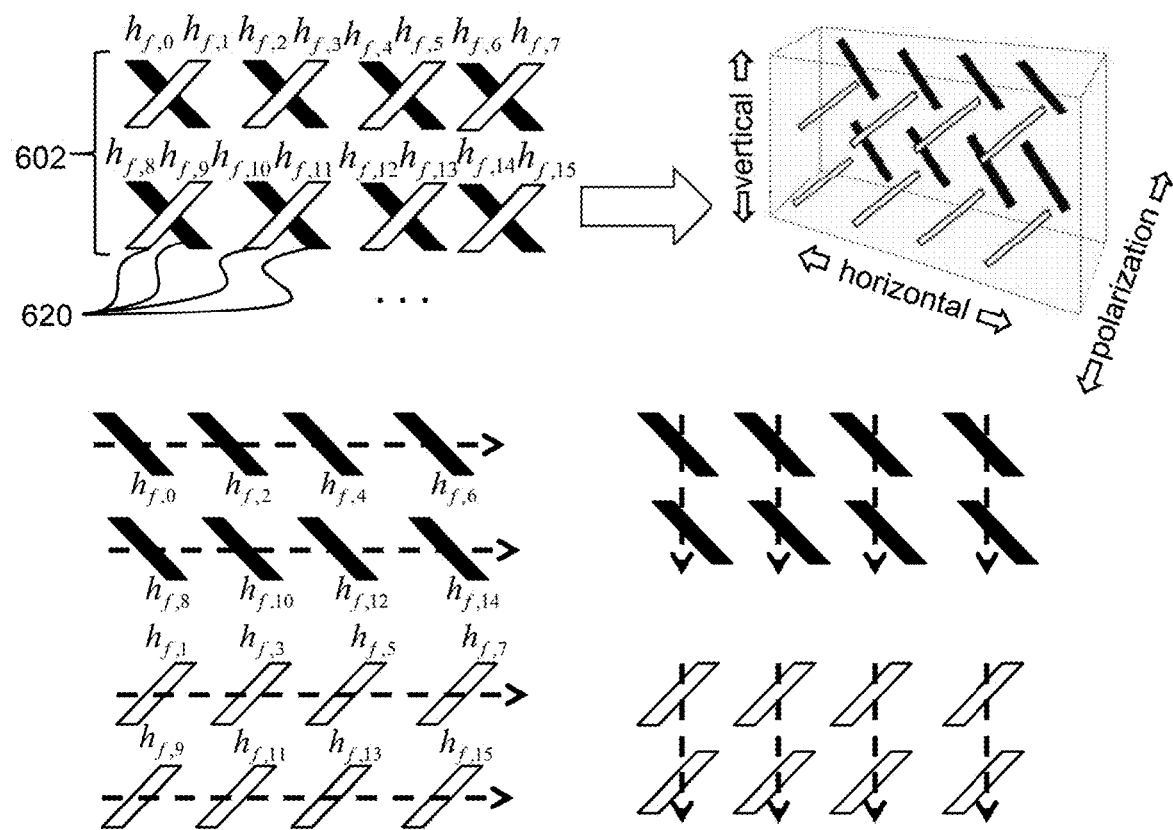
FIG. 6b is a schematic representation related to an arrangement of a number of antennas having more than one polarization direction in more than one row.

FIG. 6b schematically shows an arrangement 602 of a number of antennas 620 having more than one polarization directions in more than one row. In the example depicted in the upper left corner of FIG. 6b, there are two rows of antennas, each comprising four antennas 620 having a first polarization direction (depicted in white) and two rows of four antennas 620 having a second polarization direction (depicted in black). In total, there is a number N=16 of antennas 620, differing in their horizontal and vertical position and their polarization, as shown in the upper right corner of FIG. 6b.

Also in this case, a linear channel vector $H_f$ is given for each frequency range f in the form $$H_f = (h_{f,0} \; h_{f,1} \ldots h_{f,n} \ldots h_{f,15}).$$

Before the spatial transformation is applied to this channel vector, it has to be reshaped. For this purpose, the computation device 100 comprises the re-shaping unit 102 mentioned above.

This re-shaping is shown in the lower left corner of FIG. 6b. The elements $h_{f,n}$ are arranged in a matrix. Each row of the matrix comprises the elements of the same horizontal row of antennas having the same polarization direction. In the specific examples, 2 vertical positions and 2 polarization directions results in 2×2=4 rows, each having 4 elements.

This matrix is now subjected to a two-dimensional (2D) spatial transformation, for example 2D-DFT or 2D-FFT. This 2D transformation may be decomposed in two 1D transformations carried one after the other. For example, a spatial 1D transformation is first carried out for all the elements in a row, as shown in the lower left corner of FIG. 6b, and thereafter a spatial 1D transformation is carried out for the values obtained from the previous transformation in each column of elements with the same polarization direction, as shown in the lower right corner of FIG. 6b. By this spatial 2D transformation, the full spatial correlation is exploited.

The output of this spatial 2D transformation may be re-arranged into a linear array for each frequency range in order to provide the suitable inputs needed by the next processing steps.

Referring back to FIG. 1, the computation device 100 further comprises a compressing unit 112, 114 configured to generate compressed channel state information CCSI 115 from the transformed channel transfer function HT 110.

The compressing unit comprises a selecting unit 112 configured to select, from the transformed channel transfer function HT, a predetermined number L of values having the greatest amplitude or all the values exceeding a predetermined amplitude.

As can be seen for example in plot 405 of FIG. 4, the number of elements $h_{\tau,k}$ transformed channel transfer function HT having a relevant amplitude has largely been reduced by the combined spatial and frequency-to-time transformation. In the specific example, only 4 significant values remain of the F×N values of the original channel transfer function H. Omitting all the other values therefore largely reduces the size of a digital representation of the CSI without affecting the accuracy of the CCSI too much.

For the selection, the matrix may be re-arranged to a linear array, for example by lining up the rows of the matrix one behind the other. The linear index of each element (as an integer value) is then saved together with amplitude and phase as a triplet. Although the index refers to a linear position, it corresponds to the 2D-position (τ, k) of the corresponding element in the τ-k-grid. The elements may then be sorted, for example in descendant order, taking the amplitude as reference for sorting. Finally, the L most significant elements or all the elements exceeding a predetermined amplitude may be selected.

There is a trade-off relation between accuracy and compression. Selecting more points yields more accuracy, but leads to a smaller compression rate and thus to a higher over-head of the channel state report.

The compressing unit further comprises a report generating unit 114 configured to generate a channel state report 115 from the selected values 113 of the transformed channel transfer function HT 110. The report generating unit 114 may be configured to perform a normalization of the amplitude of the selected values with respect to the maximum amplitude. The report generating unit 114 also is configured to perform a quantization of the amplitude and/or the phase of the selected values. Thereby, the number of bits used for the digital representation is reduced.

Figure 7:
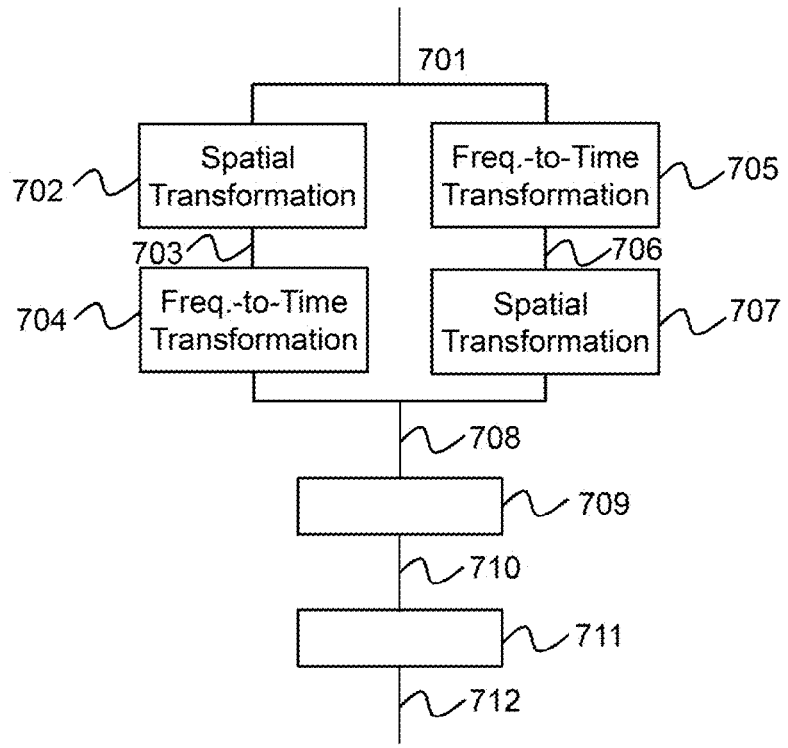
FIG. 7 is a flowchart of a method for compressing channel state information according to an embodiment of the invention.

FIG. 7 summarizes a computation method for compressing channel state information CSI to obtain compressed channel state information CCSI in form of a flow chart. CSI 701 representing a channel transfer function having a spatial dimension and a frequency dimension is subjected to a spatial transformation and a frequency-to-time transformation subsequently and in any order to obtain a transformed channel transfer function 708. As a first alternative, the spatial transformation 702 is performed on the channel transfer function 701, and the frequency-to-time transformation 704 is performed on a result 703 of the spatial transformation 702. As a second alternative, the frequency-to-time transformation 705 is performed on the channel transfer function 701, and the spatial transformation 707 is performed on a result 706 of the frequency-to-time transformation 705.

In a selection step 709, a predetermined number of values having the greatest amplitude or all the values exceeding a predetermined amplitude are selected from the transformed channel transfer function 708.

In a channel state report generating step 711, a channel state report comprising 712 the CCSI is generated from the selected values 710. The channel state report may be generated in a way that it comprises, for each selected value of the transformed channel transfer function, the position of the selected value in the transformed channel transfer function, for example in form of a triplet including the amplitude and phase of the selected value and an index indicating the position of the selected value in the transformed channel transfer function. The amplitude of the selected values may be normalized with respect to the maximum amplitude. A quantization of the amplitude and/or the phase of the selected values is carried out.

Thus, a channel state report comprising CCSI is generated. In the example shown in FIG. 13, the channel state report may then be transmitted as a feedback 1304 from the UE 1302, which in this case serves as a source device, back to the eNodeB 1301, which in this case serves as a target device. In the eNodeB 1301, the CCSI has to be decompressed to restore the original CSI. For this purpose, the transmitted values are reordered in the τ-k-grid, each of the values is de-quantized, and then an inverse transformation is performed to obtain a reconstructed CSI back in the original spatial-frequency domain. This is explained now more in detail with reference to FIGS. 8 and 9.

Figure 8:
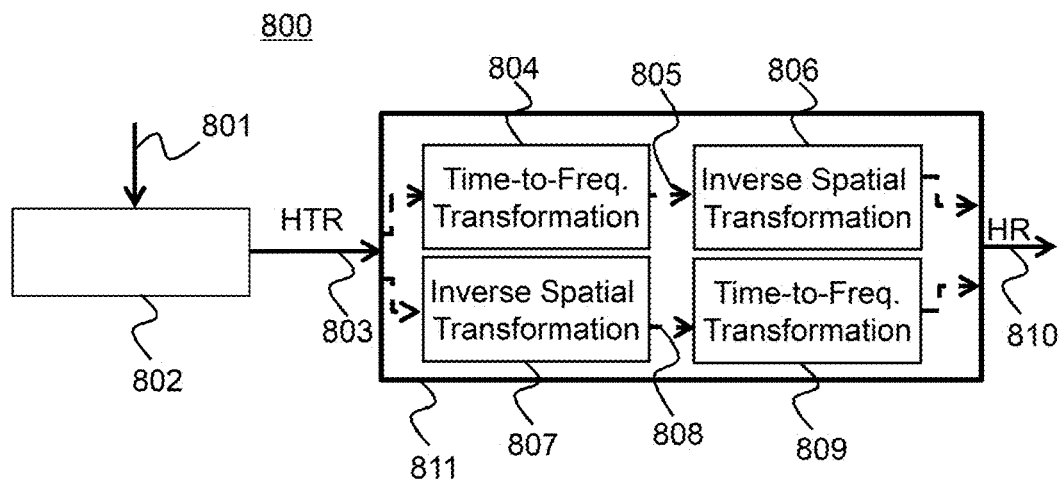
FIG. 8 is a block diagram of a device for restoring channel state information from compressed channel state information according to an embodiment of the invention.

FIG. 8 is a block diagram of a restoring device 800 which is configured to restore channel state information CSI from compressed channel state information CCSI. Such a restoring device may, for example, be included in the eNodeB 1301. The restoring device receives CCSI 801 which has, for example, been sent as a feedback 1304 by the UE 1302.

The restoring device 800 comprises a de-compressing unit 802 configured to decompress the CCSI 801 in order to obtain a restored transformed channel transfer function HTR 803. For that purpose, the de-compressing unit 802 is configured to re-arrange the values included in the CCSI 801, according to their position information also included in the CCSI 801, in a two-dimensional matrix, for example in the τ-k-grid shown in plots 405, 505 of FIGS. 4 and 5.

The compressing unit 802 is further configured to perform a de-quantization of the amplitude and/or the phase of the values. Thereby, amplitude and phase of the values is reconstructed from the compressed values. The compressing unit 802 may also be configured to re-normalize the amplitude of the values if it had been normalized for obtaining the CCSI 801. In that case, the maximum amplitude has to be included in the CCSI 801 in order to enable re-normalizing.

By performing those steps, a restored transformed channel transfer function HTR 803 is obtained which largely corresponds to the original transformed channel transfer function HT before compression. In the linear array example used above for explaining the compression, the restored transformed channel transfer function HTR 803 has the form of a matrix with $$HTR = \begin{pmatrix} h_{0,0} & h_{0,1} & \cdots & h_{0,k} & \cdots & h_{0,K-1} \\ h_{1,0} & h_{1,1} & \cdots & h_{1,k} & \cdots & h_{1,K-1} \\ \vdots & \vdots & \ddots & \vdots & \ddots & \vdots \\ h_{\tau,0} & h_{\tau,1} & \cdots & h_{\tau,k} & \cdots & h_{\tau,K-1} \\ \vdots & \vdots & \ddots & \vdots & \ddots & \vdots \\ h_{T-1,0} & h_{T-1,1} & \cdots & h_{T-1,k} & \cdots & h_{T-1,K-1} \end{pmatrix}.$$

However, the restored transformed channel transfer function HTR 803 only includes the elements $h_{\tau,k}$ selected during the decompression, not all the values of the original transformed channel transfer function HT.

In order to obtain a restored channel transfer function 810, the transformations performed during the compression have to be undone. For that purpose, the restoring device comprises a re-transforming unit 811 configured to re-transform the restored transformed channel transfer function HTR 803 by performing a time-to-frequency transformation and an inverse spatial transformation subsequently and in any order on the restored transformed channel transfer function HTR 803 to obtain the restored transfer function HR 810. Therein, the time-to-frequency and inverse spatial transformations are inverse to the transformations used for compression.

Especially, in the specific example described above, where DFT has been used as a spatial transformation and IDFT as a frequency-to-time transformation during compression, IDFT may be used as a inverse spatial transformation and DFT as a time-to-frequency transformation for the de-compression. Any other suited inverse spatial and time-to-frequency transformations may be used. Where possible, DFT and IDFT may be performed as a Fast Fourier Transformation (FFT) or an Inverse Fast Fourier Transformation (IFFT). For the inverse spatial transformation, any Inverse Principal Component Analysis (PCA) related transformation like Inverse Eigenvalue Decomposition (IEVD), Inverse Singular-Value Decomposition (ISVD) or Inverse Karhunen-Loève (IKLT) Transformation may also be used as an alternative.

Similar as the transforming unit 111, the re-transforming unit 811 is provided with two different signal paths that differ in the order in which the inverse spatial transformation and the time-to-frequency transformation are carried out.

The upper signal path is used for the case that the time-to-frequency transformation shall be performed before the inverse spatial transformation. In that case, the restored transformed channel transfer function 803 is supplied to a time-to-frequency transformation unit 804 configured to perform a time-to-frequency transformation to obtain an intermediate result 805, and the intermediate result 805 is supplied to an inverse spatial transformation unit 806 configured to perform a inverse spatial transformation to obtain the restored channel transfer function 810.

The lower signal path is used for the case that the inverse spatial transformation shall be performed before the time-to-frequency transformation. In that case, the restored transformed channel transfer function 803 is supplied to an inverse spatial transformation unit 807 configured to perform an inverse spatial transformation to obtain an intermediate result 808, and the intermediate result 808 is supplied to a time-to-frequency transformation unit 809 configured to perform a time-to-frequency transformation to obtain the transformed channel transfer function 810.

Similar as the transforming units 200 and 300, the re-transforming unit 811 may also comprise only one of the signal paths.

For the matrix representation of the restored transformed channel transfer function HTR 803 shown above, the time-to-frequency transformation is performed for the columns and the inverse spatial transformation is performed for the rows. If the time-to-frequency transformation is performed before the inverse spatial transformation, then the time-to-frequency transformation is performed for each column of the matrix HTR, and the inverse spatial transformation is performed for each row of a matrix resulting from the time-to-frequency transformation. If the inverse spatial transformation is performed before the time-to-frequency transformation, then the inverse spatial transformation is performed for each row of the matrix HTR, and the time-to-frequency transformation is performed for each column of a matrix resulting from the inverse spatial transformation.

If the compression has been performed according to the specific example explained above with reference to FIGS. 4 and 5, the time-to-frequency transformation used for re-transformation comprises a Discrete Fourier Transformation back to the frequency domain, and the inverse spatial transformation used for re-transformation comprises an Inverse Discrete Fourier Transformation back to the spatial domain of N antennas.

As explained above with reference to FIGS. 6a and 6b, the inverse spatial transformation may be a one-dimensional transformation or a multi-dimensional transformation (in two or more dimensions) depending on the arrangement of the antennas.

Figure 9:
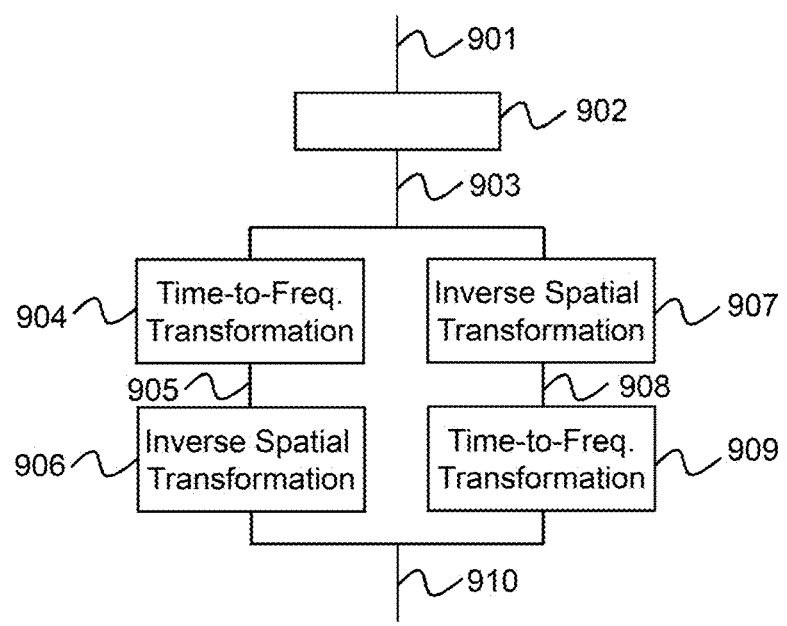
FIG. 9 is a flowchart of a method for restoring channel state information from compressed channel state information according to an embodiment of the invention.

FIG. 9 summarizes a restoring method for restoring channel state information CSI from compressed channel state CCSI in form of a flow chart. CCSI 901 is subjected to a de-compressing step 902 in order to obtain a restored transformed channel transfer function 903.

The de-compressing step 902 comprises re-arranging values included in the CCSI, according to their position information also included in the CCSI, in a two-dimensional matrix, and performing a de-quantization of the amplitude and/or the phase of the values. If the values have been normalized during a compression used for generating the CCSI, the de-compressing step may also comprise re-normalizing the amplitude of the values.

The restored transformed channel transfer function 903 is then subjected to a time-to-frequency transformation and an inverse spatial transformation subsequently and in any order to obtain a restored channel transfer function 910. As a first alternative, the time-to-frequency transformation 904 is performed on the restored transformed channel transfer function 903, and the inverse spatial transformation 906 is performed on a result 905 of the time-to-frequency transformation 904. As a second alternative, the inverse spatial transformation 907 is performed on the restored transformed channel transfer function 903, and the time-to-frequency transformation 909 is performed on a result 908 of the inverse spatial transformation 907.

Thus, the original CSI may be restored from CCSI with a high accuracy, even if a reduced number of values were selected for compressing the original CSI.

The effect of the invention is in the following demonstrated in form of a simulation for an antenna configuration similar as the one shown in the upper left corner of FIG. 6b, but with more antennas.

An antenna array comprising 32 transmitting antennas has a structure of 8 columns, 2 rows and cross-polarized pairs with ±45°. The central frequency is set to 2.1 GHz, and the antennas are separated 0.5λ in a horizontal direction and 0.78λ in a vertical direction. For the simulation, a 10 MHz FDD system with 7×3 eNodeBs (21 cells) for the network deployment is considered. Those and other relevant parameters are presented in Table 1.

TABLE 1

Main Simulation Parameters.

| SCENARIO | PARAMETER |
|---|---|
| Multiplexing | FDD |
| Carrier Frequency | 2.1 GHz |
| Bandwidth | 10 MHz |
| Sub-band Granularity | 50 sub-bands (1RB/sub-band) |
| Num. Antennas eNodeB | 32Tx (2 rows, 8 columns, 2 polarizations) |
| Num. Antennas UE | 2 |
| Number of Cells | 7 × 3 cells |
| Inter-site Distance | 500 m |
| Number of UEs | 630 |
| UE height | 1.5 m |
| BS height | 29 m |
| Channel Model | SCM |
| Scenario | UMa/NLOS |
| AS Horizontal | 15 deg |
| AS Vertical | 6 deg |
| Mobility of UEs | 3 km/h |

For the simulation, the scenario is considered where the precoder report can be implemented using a Resource Block (RB) granularity basis, therefore there are 50 sub-bands (1 RB/sub-band).

Table 2 shows the simulation results for a configuration using 4 bits for magnitude and 6 bits for phase and the number L of CSI report points (corresponding to the number of selected values in the selection step) varies from 10 to 400. A comparative case is also included, in which the CSI report has 50×32=1600 points, i.e. all the points corresponding to the 50 sub-bands and 32 antennas, with a resolution of 8 bits for magnitude and 8 bits for phase.

TABLE 2

Simulation Results.

| Parameter | all points | case 1 | case 2 | case 3 | case 4 | case 5 | case 6 | case 7 |
|---|---|---|---|---|---|---|---|---|
| Num bits magnitude | 8 | 4 | 4 | 4 | 4 | 4 | 4 | 4 |
| Num bits phase | 8 | 6 | 6 | 6 | 6 | 6 | 6 | 6 |
| L (Num points) | 1600 | 400 | 200 | 100 | 50 | 30 | 15 | 10 |
| Re-normalization coeff bits | — | 8 | 8 | 8 | 8 | 8 | 8 | 8 |
| bits p.UE/AntRx | 25600 | 8404 | 4204 | 2104 | 1054 | 634 | 319 | 214 |
| Throughput | 158.35 | 147.66 | 147.30 | 141.40 | 128.19 | 116.30 | 97.30 | 85.35 |
| Losses vs. ideal FDD | | −6.8% | −7.0% | −10.7% | −19.1% | −26.8% | −38.6% | −46.1% |

It can be noticed from results that although the number of bits is reduced with a reduced number L of selected points, the throughput degradation does not fall in the same proportion. For instance, when considering case 2 with a CSI report comprising 200 points, the number of bits with respect to the comparative case with 1600 points is reduced by 84% whereas throughput performance is degraded only by 7%. Some good trade-off balance may be found to minimize the number of bits keeping still good performance. This technique is very flexible and can potentially adapt to the resources available for CSI feedback.

Figure 10:
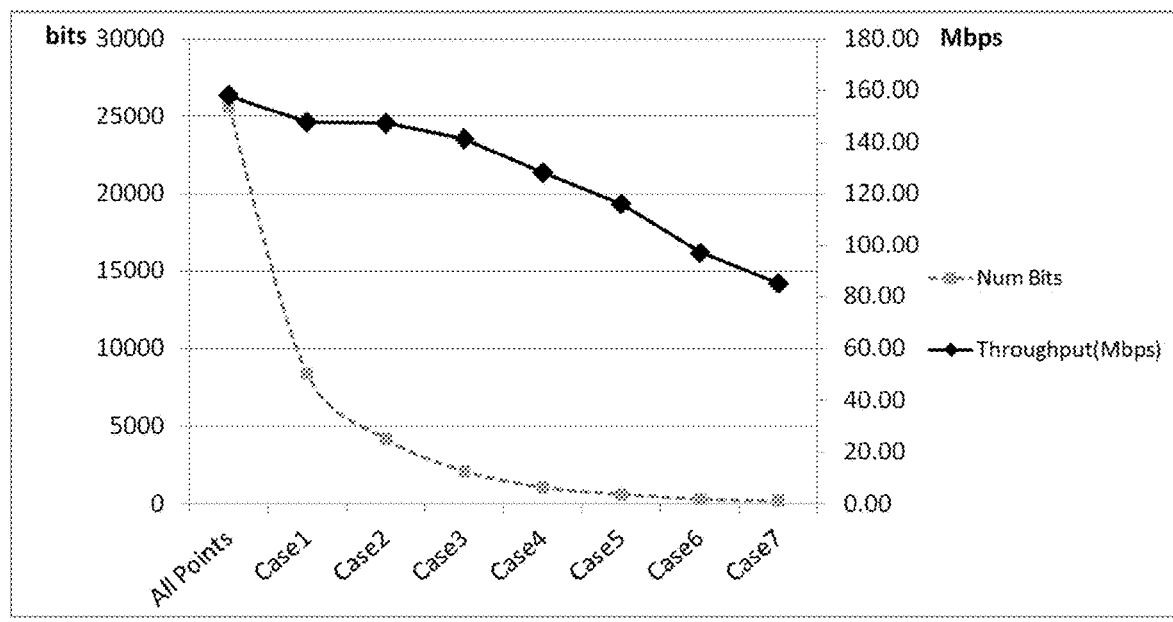
FIG. 10 is a graph showing simulation results achieved by an embodiment of the invention.

Graphical results are provided in FIG. 10. For each of the 7 cases and the comparative case, the upper graph shown in the diagram represents the throughput in Mbit/s (right scale), and the lower graph represents the number of bits required for the CSI report (left scale). The graphs give an impression of how the throughput is softly impacted while an extensive bit reduction in the CSI report is achieved.

The principle described above of combining a spatial transformation, for example a Multidimensional Discrete Fourier Transformation in the spatial domain, with a frequency-to-time transformation, for example an Inverse Discrete Fourier Transformation in the frequency domain, leads to an improved compression of the CSI by exploiting the frequency and spatial correlation. This principle is also applicable to any other scenario where it is required to transmit channel state information with reduced overhead. Particular examples where invention can be exploited are FDD MIMO feedback mechanism, Cloud RAN with limited backhaul and Channel feedback for millimeter wave scenarios. Two examples of such scenarios are indicated with reference to FIGS. 11 and 12.

Figure 11:
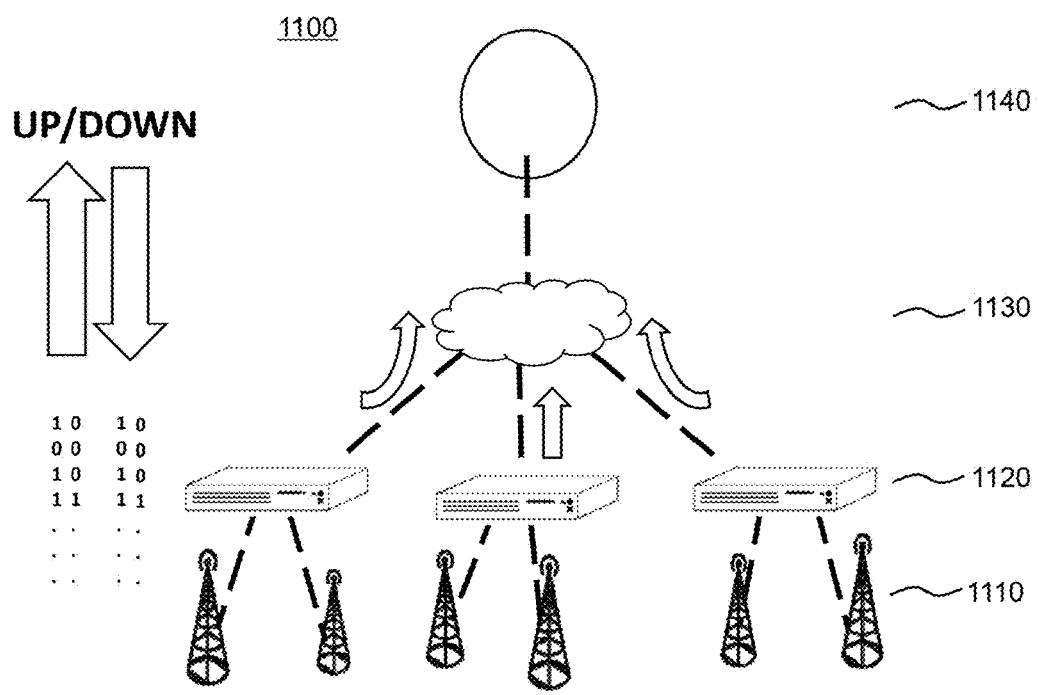
FIG. 11 is a schematic representation of a Cloud Radio Access Network (C-RAN) backhaul scenario which is an example for a system to which the invention can be applied.

A first scenario shown in FIG. 11 corresponds to the case when channel information is to be sent from a set of distributed Multi-antenna Remote Radio Units (RRU) toward a central management unit in a Cloud Ran scenario 1100. The scenario comprises different levels: a remote radio head fronthaul level 1110, a distributed baseband processing level 1120, a back-haul level 1130, and a centralized control level 1140. In this kind of environment, the backhaul capacity is limited and therefore compression would be highly beneficial to reduce congestion at this level.

Figure 12:
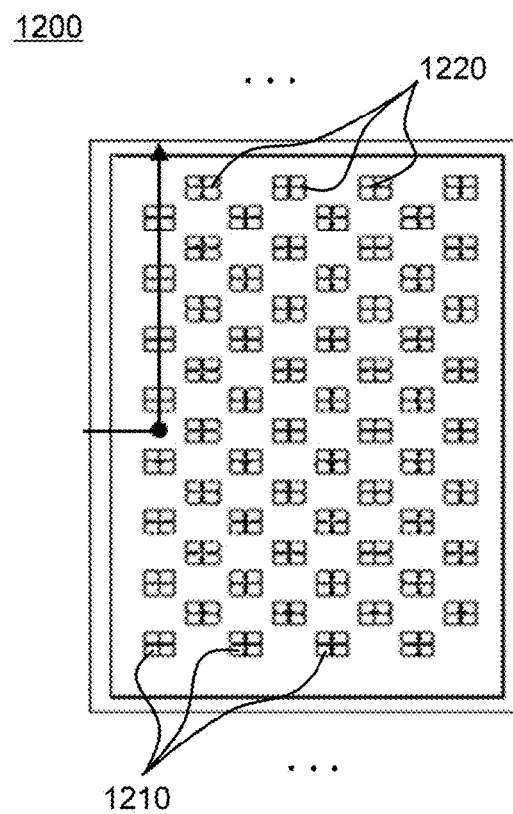
FIG. 12 is a schematic representation of another antenna configuration for millimeter wave approach which is an example for a system to which the invention can be applied.

A second scenario shown in FIG. 12 corresponds to a millimeter wave multi-antenna array 1200. Such kinds of arrays have two different superposed antenna arrays 1210, 1220 which work independently for uplink (UL) and downlink (DL). Similarly to FDD DL/UL, channel reciprocity cannot be assumed, not even for TDD systems. Thus, a CSI feedback mechanism is needed.

In summary, the invention relates to a device and a method for generating compressed channel state information CCSI from channel state information CSI representing a channel transfer function having a spatial dimension and a frequency dimension, and for restoring the CSI from the CCSI. A computation device for compressing the CSI comprises a transforming unit configured to perform a spatial transformation and a frequency-to-time transformation subsequently and in any order on the channel transfer function to obtain a transformed channel transfer function, and a compressing unit configured to select values of the transformed channel transfer function and to generate compressed channel state information CCSI based on the selected values. On the other hand, a restoring device for restoring the CSI from the CCSI comprises a de-compressing unit configured to de-compress the CCSI in order to obtain a restored transformed channel transfer function, and a re-transforming unit configured to re-transform the restored transformed channel transfer function by performing a time-to-frequency transformation and an inverse spatial transformation subsequently and in any order on the restored transformed channel transfer function to obtain the restored transfer function.

While the invention has been illustrated and described in detail in the drawings and the foregoing description, such illustration and description are to be considered illustrative or exemplary and not restrictive. The invention is not limited to the disclosed embodiments. From reading the present disclosure, other modifications will be apparent to a person skilled in the art. Such modifications may involve other features, which are already known in the art and may be used instead of or in addition to features already described herein.

The invention has been described in conjunction with various embodiments herein. However, other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. An expression of the form "A and/or B" means "A or B, or both A and B". A single processor or other unit may fulfill the functions of several items recited in the claims. The mere fact that certain measures are recited in mutually different dependent claims does not indicate that a combination of these measures cannot be used to advantage. The devices and their components may be embodied as hardware alone, for example as circuits and ASICs, or as a combination of hard- and software, for example a processor executing a program. A computer program may be stored/distributed on a suitable medium, such as an optical storage medium or a solid-state medium supplied together with or as part of other hardware, but may also be distributed in other forms, such as via the Internet or other wired or wireless telecommunication systems.

Although the invention has been described with reference to specific features and embodiments thereof, it is evident that various modifications and combinations can be made thereto without departing from the spirit and scope of the invention. The specification and drawings are, accordingly, to be regarded simply as an illustration of the invention as defined by the appended claims, and are contemplated to cover any and all modifications, variations, combinations or equivalents that fall within the scope of the invention.

What is claimed is:

1. A computation device for compressing channel state information (CSI), the CSI representing a channel transfer function H having a spatial dimension (n) and a frequency dimension (f), the computation device comprising:
a processor configured to:
perform a spatial transformation and a frequency-to-time transformation on the channel transfer function H in any order to obtain a transformed channel transfer function HT;
select values $h_{\tau,k}$ of the transformed channel transfer function HT; and
generate compressed channel state information (CCSI) based on the values $h_{\tau,k}$ of the transformed channel transfer function HT, wherein k represents spatial components and τ represents time taps,
wherein the channel transfer function H relates to a number N of antennas and a number F of frequency ranges, and is given in the form of a matrix:

$$HTR = \begin{pmatrix} H_0 \\ H_1 \\ \vdots \\ H_f \\ \vdots \\ H_{F-1} \end{pmatrix} = \begin{pmatrix} h_{0,0} & h_{0,1} & \cdots & h_{0,n} & \cdots & h_{0,N-1} \\ h_{1,0} & h_{1,1} & \cdots & h_{1,n} & \cdots & h_{1,N-1} \\ \vdots & \vdots & \ddots & \vdots & \ddots & \vdots \\ h_{f,0} & h_{f,1} & \cdots & h_{f,n} & \cdots & h_{f,N-1} \\ \vdots & \vdots & \ddots & \vdots & \ddots & \vdots \\ h_{F-1,0} & h_{F-1,1} & \cdots & h_{F-1,n} & \cdots & h_{F-1,N-1} \end{pmatrix},$$

and wherein the processor is configured to perform the spatial transformation before the frequency-to-time transformation by performing the spatial transformation for each row of the matrix H and performing the frequency-to-time transformation for each column of a matrix resulting from the spatial transformation, or
wherein the processor is configured to perform the frequency-to-time transformation before the spatial transformation by performing the frequency-to-time transformation for each column of the matrix H and performing the spatial transformation for each row of a matrix resulting from the frequency-to-time transformation.

2. The computation device according to claim 1, wherein, to generate the compressed channel state information (CCSI), the processor is configured to:
select, from the transformed channel transfer function HT, a predetermined number L of values $h_{\tau,k}$ of the transformed channel transfer function HT having the greatest amplitudes or all values $h_{\tau,k}$ of the transformed channel transfer function HT exceeding a predetermined amplitude; and
generate a channel state report based on the selected values of the transformed channel transfer function HT.

3. The computation device according to claim 1, wherein the processor is further configured to:
generate the channel state report such that the channel state report comprises, for each selected value of the transformed channel transfer function HT, the position τ, k of the selected value in the transformed channel transfer function HT; and/or
generate a channel state report such that the channel state report comprises, for each selected value of the transformed channel transfer function HT, a triplet including the amplitude and phase of the selected value and an index indicating the position $\tau$, k of the selected value in the transformed channel transfer function HT; and/or perform a normalization of the amplitude of the selected values with respect to the selected value having a maximum amplitude; and/or perform a quantization of the amplitude and/or a phase of the selected values.

4. The computation device according to claim 1, wherein the channel transfer function H is a function of one row of antennas having a number N of antennas and one polarization direction of the antennas, and the processor is configured to perform the spatial transformation as a one-dimensional spatial transformation, or wherein the channel transfer function H is a function of more than one row of antennas and/or more than one polarization direction of the antennas, each row and polarization direction having a number of antennas, and the processor is configured to perform the following steps for each frequency dimension (f);

re-shape a linear array comprising all the elements ($h_{f,n}$) of the channel transfer function H related to the respective frequency dimension (f) into a multi-dimensional array according to the number of rows and polarization directions;

perform the spatial transformation as a multi-dimensional spatial transformation; and re-arrange the results of the spatial transformation to a linear array.

5. The computation device according to claim 1, wherein the spatial transformation comprises a Discrete Fourier Transformation (DFT), a Fast Fourier Transformation (FFT), or a Principal Component Analysis (PCA) transformation, and/or the frequency-to-time transformation comprises an Inverse Discrete Fourier Transformation or an Inverse Fast Fourier Transformation.

6. A restoring device for restoring channel state information (CSI) from compressed channel state information (CCSI), the CSI representing a channel transfer function H having a spatial dimension (n) and a frequency dimension (f), the restoring device comprising:

a processor configured to:

de-compress the CCSI to obtain a restored transformed channel transfer function HTR; and re-transform the restored transformed channel transfer function HTR by performing a time-to-frequency transformation and an inverse spatial transformation on the restored transformed channel transfer function HTR in any order to obtain a restored transfer function HR, wherein the restored transformed channel transfer function HTR relates to a number T of time taps and a number K of spatial components, and is given in the form of a matrix:

$$HTR = \begin{pmatrix} H_0 \\ H_1 \\ \vdots \\ H_\tau \\ \vdots \\ H_{T-1} \end{pmatrix} = \begin{pmatrix} h_{0,0} & h_{0,1} & \cdots & h_{0,k} & \cdots & h_{0,K-1} \\ h_{1,0} & h_{1,1} & \cdots & h_{1,k} & \cdots & h_{1,K-1} \\ \vdots & \vdots & \ddots & \vdots & \ddots & \vdots \\ h_{\tau,0} & h_{\tau,1} & \cdots & h_{\tau,k} & \cdots & h_{\tau,K-1} \\ \vdots & \vdots & \ddots & \vdots & \ddots & \vdots \\ h_{T-1,0} & h_{T-1,1} & \cdots & h_{T-1,k} & \cdots & h_{T-1,K-1} \end{pmatrix},$$

and wherein the processor is configured to perform the time-to-frequency transformation before the inverse spatial transformation by performing the time-to-frequency transformation for each column of the matrix HTR and performing the inverse spatial transformation for each row of a matrix resulting from the time-to-frequency transformation, or wherein the processor is configured to perform the inverse spatial transformation before the time-to-frequency transformation by performing the inverse spatial transformation for each row of the matrix HTR and performing the time-to-frequency transformation for each column of a matrix resulting from the inverse spatial transformation.

7. The restoring device according to claim 6, wherein, to de-compress the CCSI, the processor is configured to:

re-arrange values included in the CCSI, according to position information $\tau$, k included in the CCSI, in a two-dimensional matrix; and/or perform a de-quantization of an amplitude and/or a phase of the values; and/or re-normalize the amplitude of the values, wherein k represents a spatial component position and $\tau$ represents a time tap position of the CCSI.

8. The restoring device according to claim 7, wherein the restored channel transfer function HR is a function of one row of antennas having a number N of antennas and one polarization direction of the antennas, and the processor is configured to perform the inverse spatial transformation as a one-dimensional inverse spatial transformation, or wherein the restored channel transfer function HR is a function of more than one row of antennas and/or more than one polarization direction of the antennas, each row and/or polarization direction having a number of antennas, and the processor is configured to perform the following steps for each time tap $\tau$;

re-shape a linear array comprising all the elements $h_{\tau,k}$ of the restored transformed channel transfer function HTR related to the respective time tap $\tau$ into a multi-dimensional array according to the number of rows and polarization directions;

perform the inverse spatial transformation as a multi-dimensional inverse spatial transformation; and re-arrange the results of the inverse spatial transformation into a linear array.

9. The restoring device according to claim 6, wherein the time-to-frequency transformation comprises a Discrete Fourier Transformation or a Fast Fourier Transformation, and/or the inverse spatial transformation comprises an Inverse Discrete Fourier Transformation (IDFT), an Inverse Fast Fourier Transformation (IFFT), or an Inverse Principal Component Analysis (PCA) transformation.

10. A computation method for compressing channel state information (CSI), the CSI representing a channel transfer function H having a spatial dimension (n) and a frequency dimension (f), the computation method comprising:

performing, by a processor, a spatial transformation and a frequency-to-time transformation on the channel transfer function H in any order to obtain a transformed channel transfer function HT;

selecting values $h_{\tau,k}$ of the transformed channel transfer function HT; and generating compressed channel state information (CCSI) based on the values $h_{\tau,k}$ of the transformed channel transfer function HT, wherein k represents spatial components and $\tau$ represents time taps, wherein the channel transfer function H relates to a number N of antennas and a number F of frequency ranges, and is given in the form of a matrix:

$$HTR = \begin{pmatrix} H_0 \\ H_1 \\ \vdots \\ H_f \\ \vdots \\ H_{F-1} \end{pmatrix} = \begin{pmatrix} h_{0,0} & h_{0,1} & \cdots & h_{0,n} & \cdots & h_{0,N-1} \\ h_{1,0} & h_{1,1} & \cdots & h_{1,n} & \cdots & h_{1,N-1} \\ \vdots & \vdots & \ddots & \vdots & \ddots & \vdots \\ h_{f,0} & h_{f,1} & \cdots & h_{f,n} & \cdots & h_{f,N-1} \\ \vdots & \vdots & \ddots & \vdots & \ddots & \vdots \\ h_{F-1,0} & h_{F-1,1} & \cdots & h_{F-1,n} & \cdots & h_{F-1,N-1} \end{pmatrix},$$

and wherein the spatial transformation is performed before the frequency-to-time transformation by performing the spatial transformation for each row of the matrix H and performing the frequency-to-time transformation for each column of a matrix resulting from the spatial transformation, or wherein the frequency-to-time transformation is performed before the spatial transformation by performing the frequency-to-time transformation for each column of the matrix H and performing the spatial transformation for each row of a matrix resulting from the frequency-to-time transformation.

11. A method for restoring channel state information (CSI) from compressed channel state information (CCSI), the CSI representing a channel transfer function H having a spatial dimension (n) and a frequency dimension (f), the method comprising:

de-compress, by a processor, the CCSI to obtain a restored transformed channel transfer function HTR; and re-transform, by the processor, the restored transformed channel transfer function HTR by performing a time-to-frequency transformation and an inverse spatial transformation on the restored transformed channel transfer function HTR in any order to obtain a restored transfer function HR, wherein the restored transformed channel transfer function HTR relates to a number T of time taps and a number K of spatial components, and is given in the form of a matrix:

$$HTR = \begin{pmatrix} H_0 \\ H_1 \\ \vdots \\ H_f \\ \vdots \\ H_{F-1} \end{pmatrix} = \begin{pmatrix} h_{0,0} & h_{0,1} & \cdots & h_{0,n} & \cdots & h_{0,N-1} \\ h_{1,0} & h_{1,1} & \cdots & h_{1,n} & \cdots & h_{1,N-1} \\ \vdots & \vdots & \ddots & \vdots & \ddots & \vdots \\ h_{f,0} & h_{f,1} & \cdots & h_{f,n} & \cdots & h_{f,N-1} \\ \vdots & \vdots & \ddots & \vdots & \ddots & \vdots \\ h_{F-1,0} & h_{F-1,1} & \cdots & h_{F-1,n} & \cdots & h_{F-1,N-1} \end{pmatrix},$$

and wherein the processor is configured to perform the time-to-frequency transformation before the inverse spatial transformation by performing the time-to-frequency transformation for each column of the matrix HTR and performing the inverse spatial transformation for each row of a matrix resulting from the time-to-frequency transformation, or wherein the processor is configured to perform the inverse spatial transformation before the time-to-frequency transformation by performing the inverse spatial transformation for each row of the matrix HTR and performing the time-to-frequency transformation for each column of a matrix resulting from the inverse spatial transformation.

12. A non-transitory computer-readable medium, having computer program instructions stored thereon, which when executed by a processor, cause the processor to execute the method of claim 10.

* * * * *

UNITED STATES PATENT AND TRADEMARK OFFICE
CERTIFICATE OF CORRECTION

PATENT NO. : 11,424,853 B2
APPLICATION NO. : 16/833269
DATED : August 23, 2022
INVENTOR(S) : Lyashev et al.

It is certified that error appears in the above-identified patent and that said Letters Patent is hereby corrected as shown below:

On the Title Page

Page 2: item [56] Other Publications, Column 2, Lines 35-36: "Kusume et al., "Hybrid Single/Multi-User MIMO TransmissionBased on Implicit Channel Feedback," IEEE ICC 2011, Kyoto" should read -- Kusume et al., "Hybrid Single/Multi-User MIMO Transmission Based on Implicit Channel Feedback," IEEE ICC 2011, Kyoto --.

Page 2: item [56] Other Publications, Column 2, Lines 39-40: "Lee et al.,"Exploiting Dominant Eigendirections for FeedbackCompression for FDD-based Massive MIMO Systems", IEEE ICC 2016-" should read -- Lee et al.,"Exploiting Dominant Eigendirections for Feedback Compression for FDD-based Massive MIMO Systems", IEEE ICC 2016- --.

Page 2: item [56] Other Publications, Column 2, Line 45: "FeedbackScheme for FD-MIMO Systems," 2015 IEEE Globecom" should read -- Feedback Scheme for FD-MIMO Systems," 2015 IEEE Globecom --.

In the Claims

Claim 1: Column 24, Lines 25-33:

"$$HTR = \begin{pmatrix} H_0 \\ H_1 \\ \vdots \\ H_f \\ \vdots \\ H_{F-1} \end{pmatrix} = \begin{pmatrix} h_{0,0} & h_{0,1} & \cdots & h_{0,n} & \cdots & h_{0,N-1} \\ h_{1,0} & h_{1,1} & \cdots & h_{1,n} & \cdots & h_{1,N-1} \\ \vdots & \vdots & \ddots & \vdots & \ddots & \vdots \\ h_{f,0} & h_{f,1} & \cdots & h_{f,n} & \cdots & h_{f,N-1} \\ \vdots & \vdots & \ddots & \vdots & \ddots & \vdots \\ h_{F-1,0} & h_{F-1,1} & \cdots & h_{F-1,n} & \cdots & h_{F-1,N-1} \end{pmatrix},$$
" should read Signed and Sealed this
Twenty-eighth Day of February, 2023

Katherine Kelly Vidal
*Director of the United States Patent and Trademark Office*

$$H = \begin{pmatrix} H_0 \\ H_1 \\ \vdots \\ H_f \\ \vdots \\ H_{F-1} \end{pmatrix} = \begin{pmatrix} h_{0,0} & h_{0,1} & \cdots & h_{0,n} & \cdots & h_{0,N-1} \\ h_{1,0} & h_{1,1} & \cdots & h_{1,n} & \cdots & h_{1,N-1} \\ \vdots & \vdots & \ddots & \vdots & \ddots & \vdots \\ h_{f,0} & h_{f,1} & \cdots & h_{f,n} & \cdots & h_{f,N-1} \\ \vdots & \vdots & \ddots & \vdots & \ddots & \vdots \\ h_{F-1,0} & h_{F-1,1} & \cdots & h_{F-1,n} & \cdots & h_{F-1,N-1} \end{pmatrix}$$

-- --.

Claim 10: Column 27, Lines 1-8:

" $$HTR = \begin{pmatrix} H_0 \\ H_1 \\ \vdots \\ H_f \\ \vdots \\ H_{F-1} \end{pmatrix} = \begin{pmatrix} h_{0,0} & h_{0,1} & \cdots & h_{0,n} & \cdots & h_{0,N-1} \\ h_{1,0} & h_{1,1} & \cdots & h_{1,n} & \cdots & h_{1,N-1} \\ \vdots & \vdots & \ddots & \vdots & \ddots & \vdots \\ h_{f,0} & h_{f,1} & \cdots & h_{f,n} & \cdots & h_{f,N-1} \\ \vdots & \vdots & \ddots & \vdots & \ddots & \vdots \\ h_{F-1,0} & h_{F-1,1} & \cdots & h_{F-1,n} & \cdots & h_{F-1,N-1} \end{pmatrix},$$ " should read $$H = \begin{pmatrix} H_0 \\ H_1 \\ \vdots \\ H_f \\ \vdots \\ H_{F-1} \end{pmatrix} = \begin{pmatrix} h_{0,0} & h_{0,1} & \cdots & h_{0,n} & \cdots & h_{0,N-1} \\ h_{1,0} & h_{1,1} & \cdots & h_{1,n} & \cdots & h_{1,N-1} \\ \vdots & \vdots & \ddots & \vdots & \ddots & \vdots \\ h_{f,0} & h_{f,1} & \cdots & h_{f,n} & \cdots & h_{f,N-1} \\ \vdots & \vdots & \ddots & \vdots & \ddots & \vdots \\ h_{F-1,0} & h_{F-1,1} & \cdots & h_{F-1,n} & \cdots & h_{F-1,N-1} \end{pmatrix},$$

-- --.

Claim 11: Column 28, Lines 5-13:

" $$HTR = \begin{pmatrix} H_0 \\ H_1 \\ \vdots \\ H_f \\ \vdots \\ H_{F-1} \end{pmatrix} = \begin{pmatrix} h_{0,0} & h_{0,1} & \cdots & h_{0,n} & \cdots & h_{0,N-1} \\ h_{1,0} & h_{1,1} & \cdots & h_{1,n} & \cdots & h_{1,N-1} \\ \vdots & \vdots & \ddots & \vdots & \ddots & \vdots \\ h_{f,0} & h_{f,1} & \cdots & h_{f,n} & \cdots & h_{f,N-1} \\ \vdots & \vdots & \ddots & \vdots & \ddots & \vdots \\ h_{F-1,0} & h_{F-1,1} & \cdots & h_{F-1,n} & \cdots & h_{F-1,N-1} \end{pmatrix},$$ " should read $$HTR = \begin{pmatrix} H_0 \\ H_1 \\ \vdots \\ H_\tau \\ \vdots \\ H_{T-1} \end{pmatrix} = \begin{pmatrix} h_{0,0} & h_{0,1} & \cdots & h_{0,k} & \cdots & h_{0,K-1} \\ h_{1,0} & h_{1,1} & \cdots & h_{1,k} & \cdots & h_{1,K-1} \\ \vdots & \vdots & \ddots & \vdots & \ddots & \vdots \\ h_{\tau,0} & h_{\tau,1} & \cdots & h_{\tau,k} & \cdots & h_{\tau,K-1} \\ \vdots & \vdots & \ddots & \vdots & \ddots & \vdots \\ h_{T-1,0} & h_{T-1,1} & \cdots & h_{T-1,k} & \cdots & h_{T-1,K-1} \end{pmatrix},$$

-- --.